(12) United States Patent
Jang et al.

(10) Patent No.: US 12,267,867 B2
(45) Date of Patent: Apr. 1, 2025

(54) METHOD AND APPARATUS FOR ACCESSING CHANNEL IN WIRELESS LAN SYSTEM

(71) Applicant: LG Electronics Inc., Seoul (KR)

(72) Inventors: Insun Jang, Seoul (KR); Jinsoo Choi, Seoul (KR); Jiin Kim, Seoul (KR); Sunhee Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/734,758

(22) Filed: Jun. 5, 2024

(65) Prior Publication Data

US 2024/0324015 A1 Sep. 26, 2024

Related U.S. Application Data

(63) Continuation of application No. PCT/KR2023/004190, filed on Mar. 29, 2023.

(30) Foreign Application Priority Data

Mar. 29, 2022 (KR) .................. 10-2022-0039039

(51) Int. Cl.
*H04W 74/0816* (2024.01)
*H04W 84/12* (2009.01)

(52) U.S. Cl.
CPC ........ *H04W 74/0816* (2013.01); *H04W 84/12* (2013.01)

(58) Field of Classification Search
CPC .......................... H04W 74/0816; H04W 84/12
See application file for complete search history.

(56) References Cited

U.S. PATENT DOCUMENTS

2022/0078844 A1* 3/2022 Cherian ............ H04W 74/0808

FOREIGN PATENT DOCUMENTS

| KR | 10-2017-0109556 | 9/2017 |
| KR | 10-2019-0021337 | 3/2019 |
| KR | 10-2021-0143171 | 11/2021 |
| WO | WO 2021/182902 A1 | 9/2021 |
| WO | WO 2022/035291 A1 | 2/2022 |

OTHER PUBLICATIONS

International Search Report and Written Opinion in International Appln. No. PCT/KR2023/004190, mailed on Jul. 12, 2023, 8 pages (with English translation).

(Continued)

*Primary Examiner* — Mohammad S Anwar
(74) *Attorney, Agent, or Firm* — Fish & Richardson P.C.

(57) ABSTRACT

Disclosed are a method and an apparatus for accessing a channel in a wireless LAN system. A method performed by a station (STA) in a wireless LAN system according to an embodiment of the present disclosure may comprise the steps of: receiving information related to a restricted-target wake time (R-TWT) service period (SP) from an access point (AP); and setting at least one R-TWT traffic identifier (TID) for the R-TWT SP. Here, whether to perform a back-off operation for an access category (AC) in the R-TWT SP may be determined on the basis of a mapping relationship between the at least one R-TWT TID and the AC.

16 Claims, 22 Drawing Sheets

(56) References Cited

OTHER PUBLICATIONS

Lu et al., "Consideration on EDCA Operation for Restricted TWT," IEEE 802.11-21/1913r5, Nov. 15, 2021, 16 pages.
Guo et al., "CR for rTWT TID Selection Rules," IEEE 802.11-22/0514r0, Mar. 18, 2022, 3 pages.
Office Action in Korean Appln. No. 10-2024-7015586, mailed on Jul. 19, 2024, 13 pages (with English translation).
Hu et al., "CC34—TBD and CID Resolution for Restricted TWT Quiet Interval Usage," IEEE 802.11-21/0683r5, May 10, 2021, 7 pages.

\* cited by examiner

FIG. 16

| B0  B2 | B3 | B4 | B5  B6 | B7 | B8  Bn |
|---|---|---|---|---|---|
| TWT Flow Identifier | Response Requested | Next TWT Request | Next TWT Subfield Size | All TWT | Next TWT |
| Bits: 3 | 1 | 1 | 2 | 1 | 0,32,48,or 64 |

FIG. 19

Broadcast TWT Parameter Set field format

| Request Type | Target Wake Time | Nominal Minimum TWT Wake Duration | TWT Wake Interval Mantissa | Broadcast TWT Info |
|---|---|---|---|---|
| B0 B1 | | | | |

Octets: 2 | 2 | 1 | 2 | 2

| Reserved | Broadcast TWT ID | Broadcast TWT Persistence |
|---|---|---|
| B0 B2 | B3 B7 | B8 B15 |

| TWT Request | TWT Setup Command | Trigger | Last Broadcast Parameter Set | Flow Type | Broadcast TWT Recommendation | TWT Wake Interval Exponent | Reserved |
|---|---|---|---|---|---|---|---|
| B0 | B1 B3 | B4 | B5 | B6 | B7 B9 | B10 B14 | B15 |

Bits: 1 | 3 | 1 | 1 | 1 | 3 | 5 | 1

METHOD AND APPARATUS FOR ACCESSING CHANNEL IN WIRELESS LAN SYSTEM

CROSS-REFERENCE TO RELATED APPLICATIONS

This application is a continuation of International Application No. PCT/KR2023/004190, filed on Mar. 29, 2023, which claims the benefit of earlier filing date and right of priority to Korean Application No. 10-2022-0039039, filed on Mar. 29, 2022, the contents of which are all incorporated by reference herein in their entireties.

TECHNICAL FIELD

The present disclosure relates to a method and apparatus for a channel access in a wireless local area network (WLAN) system, and more specifically, it relates to a method and apparatus for a channel access method considering to a restricted target wake time (TWT) service period in a next-generation wireless LAN system.

BACKGROUND

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

In order to provide a more improved wireless communication environment, an enhancement technologies for EHT (Extremely High Throughput) are being discussed. For example, technologies for multiple access point (AP) coordination and multiple input multiple output (MIMO) supporting an increased bandwidth, efficient utilization of multiple bands and increased spatial streams are being studied, and, in particular, various technologies for supporting low latency or real-time traffic are being studied.

SUMMARY

The technical object of the present disclosure is to provide a method and apparatus for performing channel access in a wireless LAN system.

An additional technical object of the present disclosure is to provide a method and apparatus related to channel access considering a restricted target wake time (TWT) service period in a wireless LAN system.

The technical objects to be achieved by the present disclosure are not limited to the above-described technical objects, and other technical objects which are not described herein will be clearly understood by those skilled in the pertinent art from the following description.

A method performed by a station (STA) in a wireless local area network (WLAN) system according to an aspects of the present disclosure may comprise: receiving information related to a restricted-target wake time (R-TWT) service period (SP) from an access point (AP); and setting at least one R-TWT traffic identifier (TID) for the R-TWT SP. Herein, whether to perform a back-off operation for an access category (AC) within the R-TWT SP is determined based on a mapping relation between the at least one R-TWT TID and the AC.

According to the present disclosure, a method and apparatus for performing channel access in a wireless LAN system may be provided.

According to the present disclosure, a method and apparatus related to channel access considering a restricted target wake time (TWT) service period in a wireless LAN system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

The accompanying drawings, which are included as part of the detailed description to aid understanding of the present disclosure, provide embodiments of the present disclosure and together with the detailed description describe technical features of the present disclosure.

FIG. 16 is a diagram for describing an example of a TWT information field format.

FIG. 19 is a diagram for explaining examples of the broadcast TWT parameter set field format.

DETAILED DESCRIPTION

Figure 1:
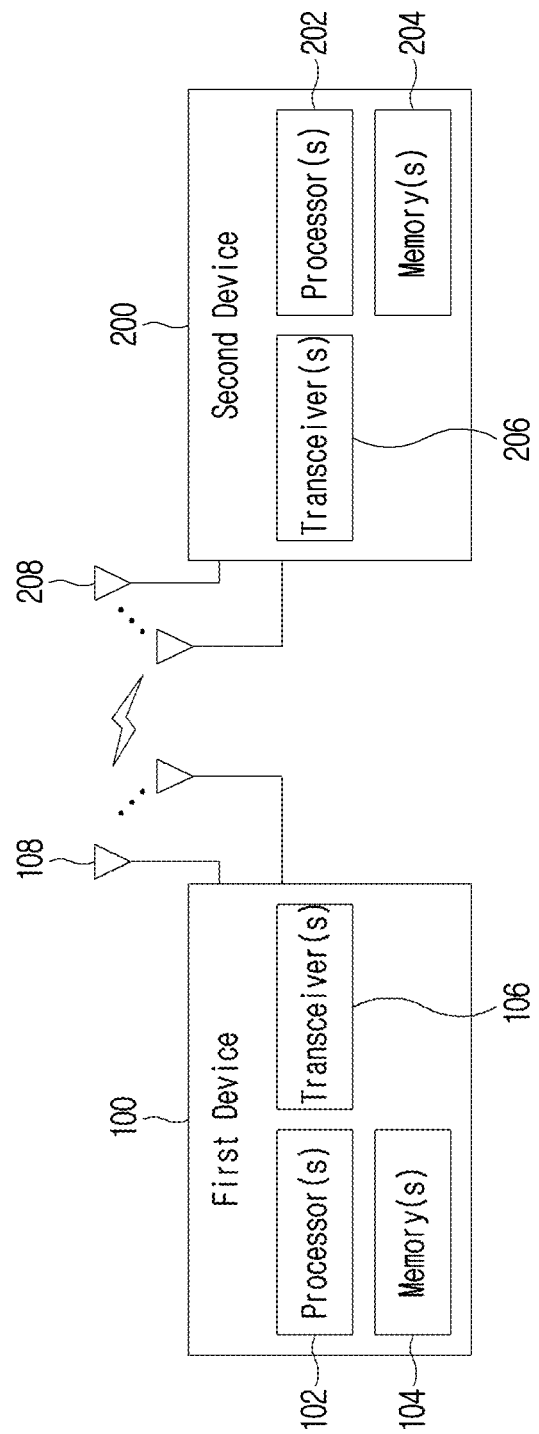
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) Determining/acquiring/configuring/calculating/decoding/encoding bit information of fields (signal (SIG), short training field (STF), long training field (LTF), Data, etc.) included in the PPDU, 2) Determining/configuring/acquiring time resources or frequency resources (e.g., subcarrier resources) used for fields (SIG, STF, LTF, Data, etc.) included in the PPDU; 3) Determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
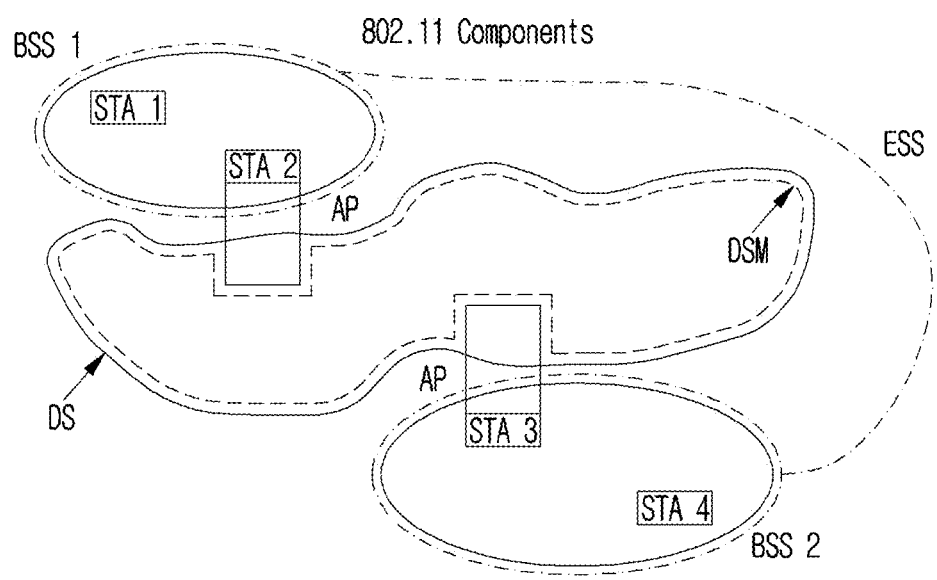
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
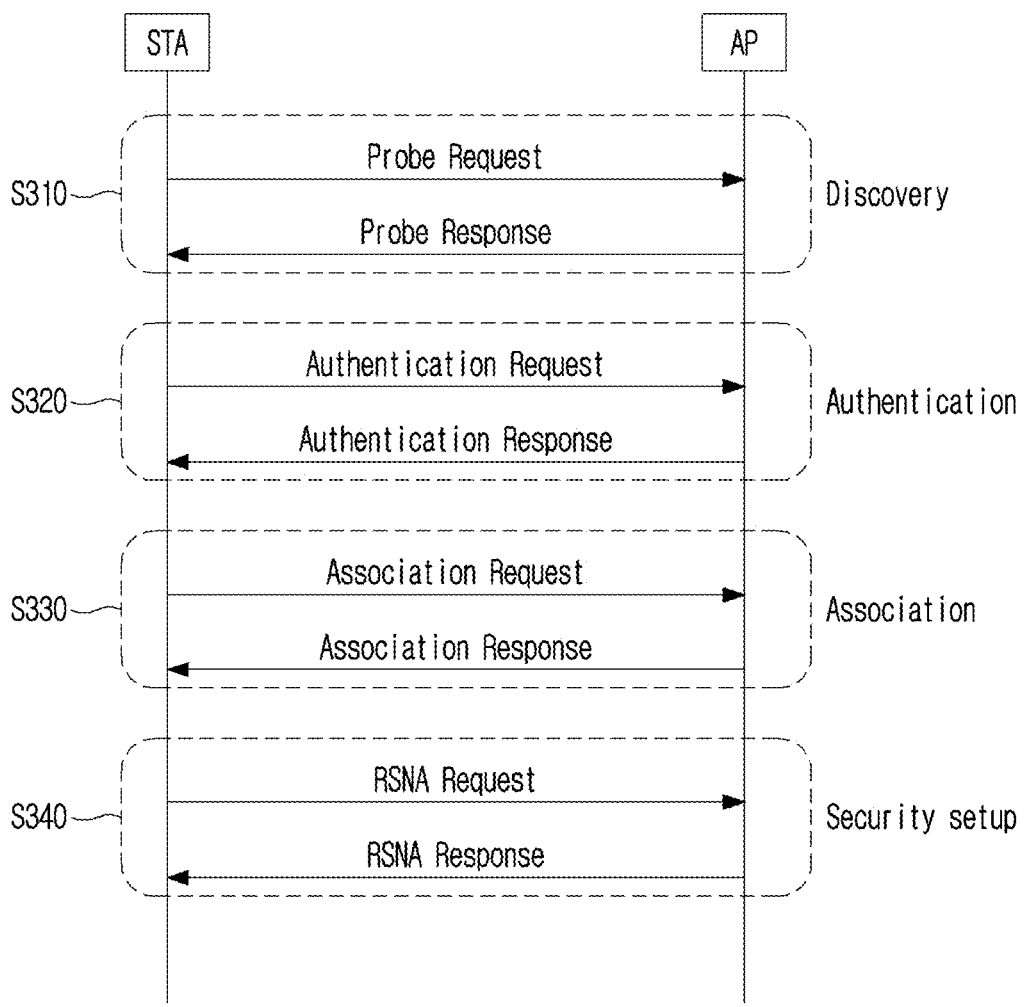
FIG. 3 is a diagram for explaining a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QOS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
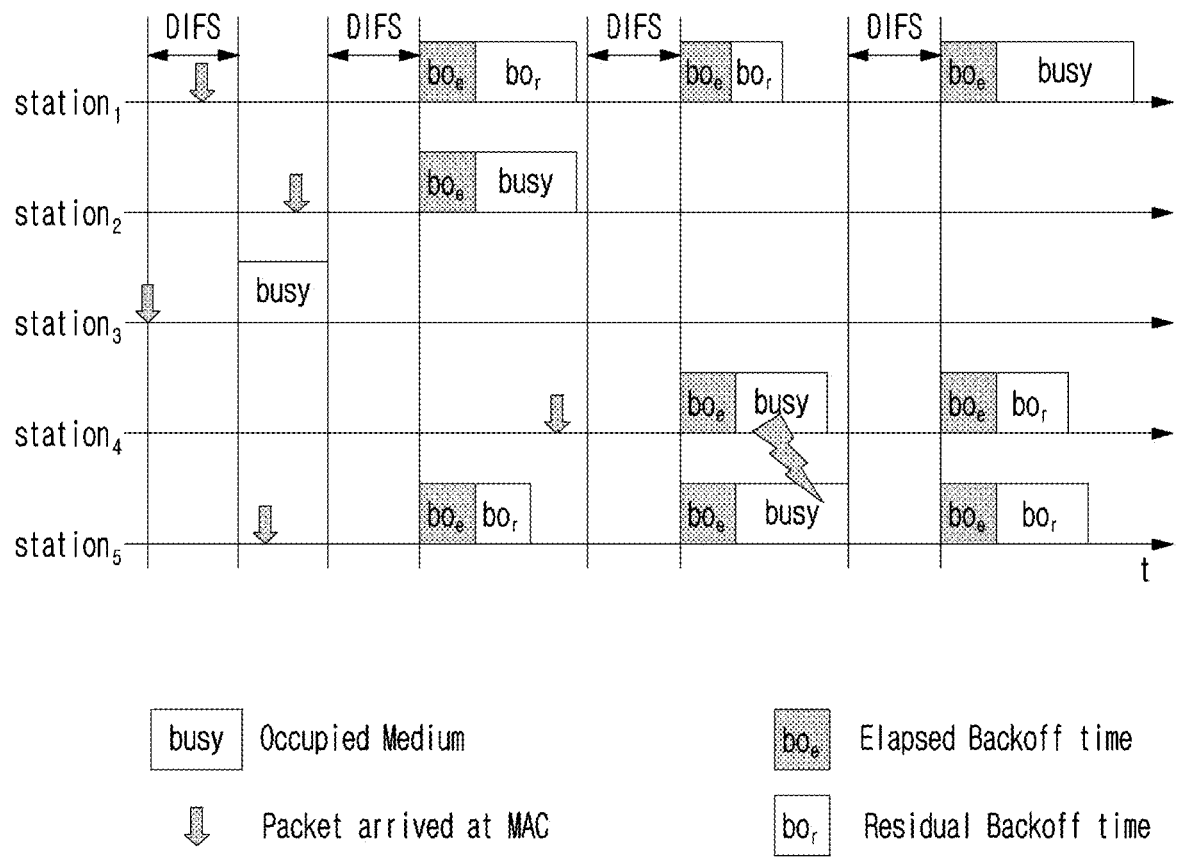
FIG. 4 is a diagram for explaining a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to $2n-1$ ($n=0, 1, 2, \ldots$).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STA5 is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STA5 is shorter than that of STA1, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (Block-ACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QOS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
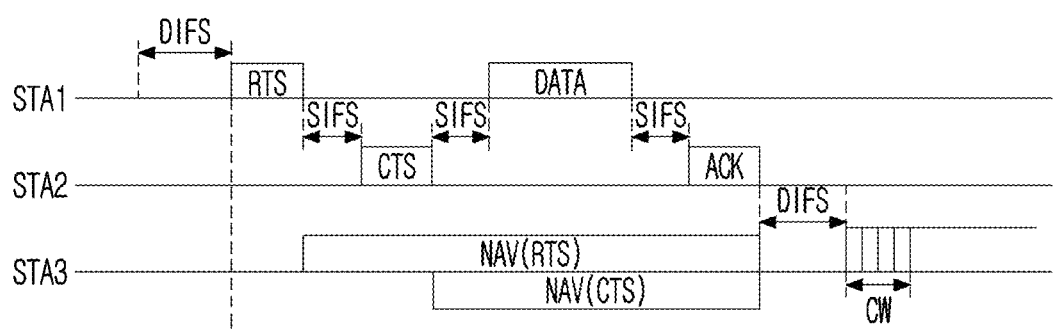
FIG. 5 is a diagram for explaining a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
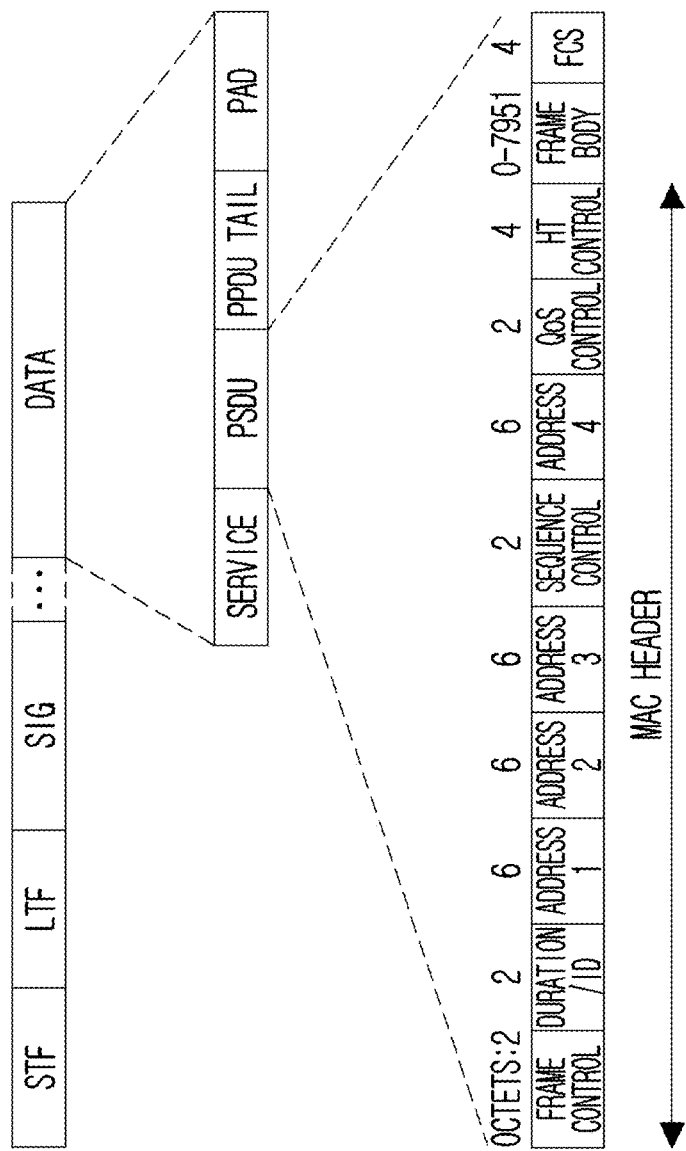
FIG. 6 is a diagram for explaining an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU frame may include a Short Training Field (STF), a Long Training Field (LTF), a SIGNAL (SIG) field, and a Data field. The most basic (e.g., non-High Throughput (HT)) PPDU frame format may consist of only L-STF (Legacy-STF), L-LTF (Legacy-LTF), SIG field, and data field. In addition, depending on the type of PPDU frame format (e.g., HT-mixed format PPDU, HT-greenfield format PPDU, VHT (Very High Throughput) PPDU, etc.), an additional (or different type) STF, LTF, and SIG fields may be included between the SIG field and the data field (this will be described later with reference to FIG. 7).

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include a RATE field and a LENGTH field. The RATE field may include information on modulation and coding rates of data. The LENGTH field may include information on the length of data. Additionally, the SIG field may include a parity bit, a SIG TAIL bit, and the like.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

A null-data packet (NDP) frame format means a frame format that does not include a data packet. That is, the NDP frame refers to a frame format that includes a physical layer convergence procedure (PLCP) header part (i.e., STF, LTF, and SIG fields) in a general PPDU frame format and does not include the remaining parts (i.e., data field). A NDP frame may also be referred to as a short frame format.

Figure 7:
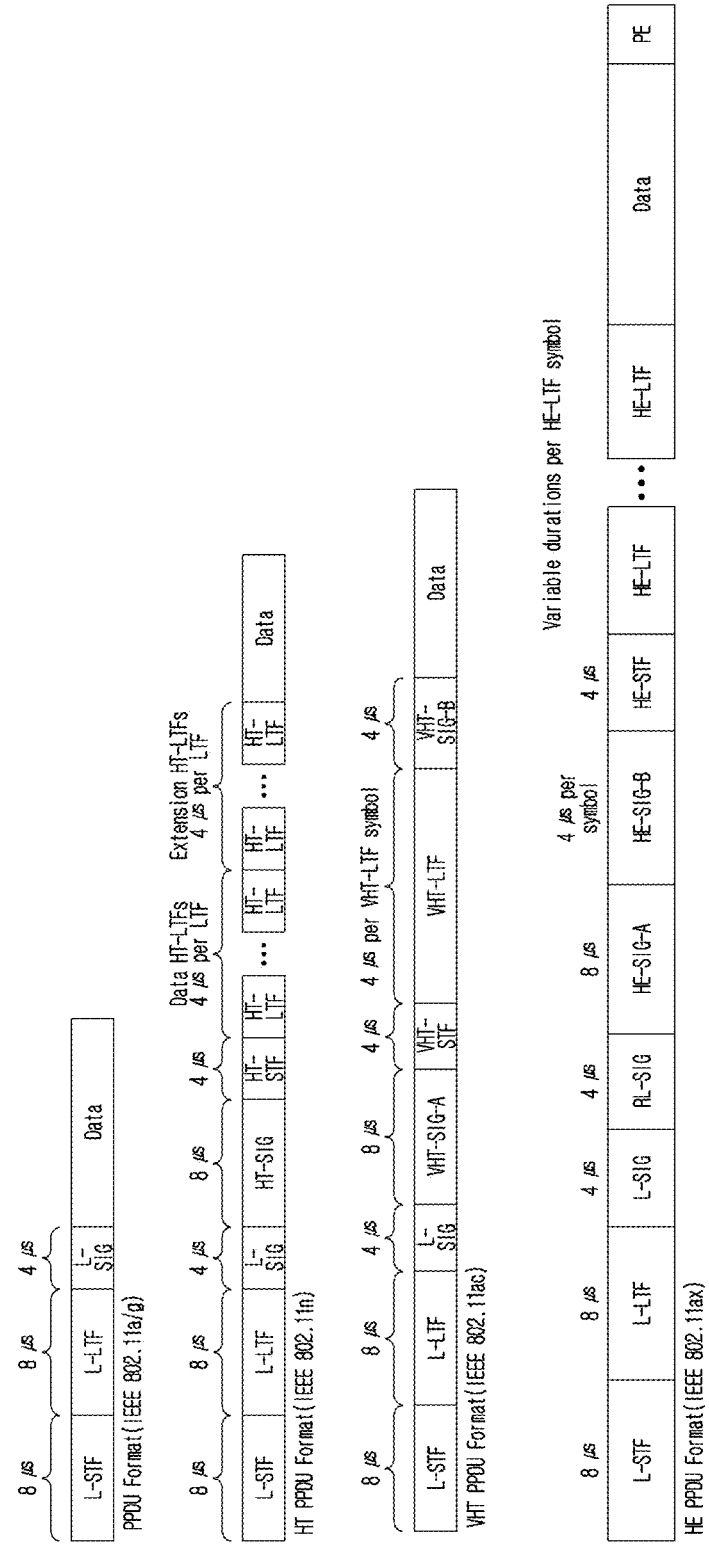
FIG. 7 is a diagram illustrating examples of PPDUs defined in the IEEE 802.11 standard to which the present disclosure may be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format.

The HT PPDU format (IEEE 802.11n) additionally includes HT-SIG, HT-STF, and HT-LFT(s) fields to the basic PPDU format. The HT PPDU format shown in FIG. 7 may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format.

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format. Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us.

Figure 8:
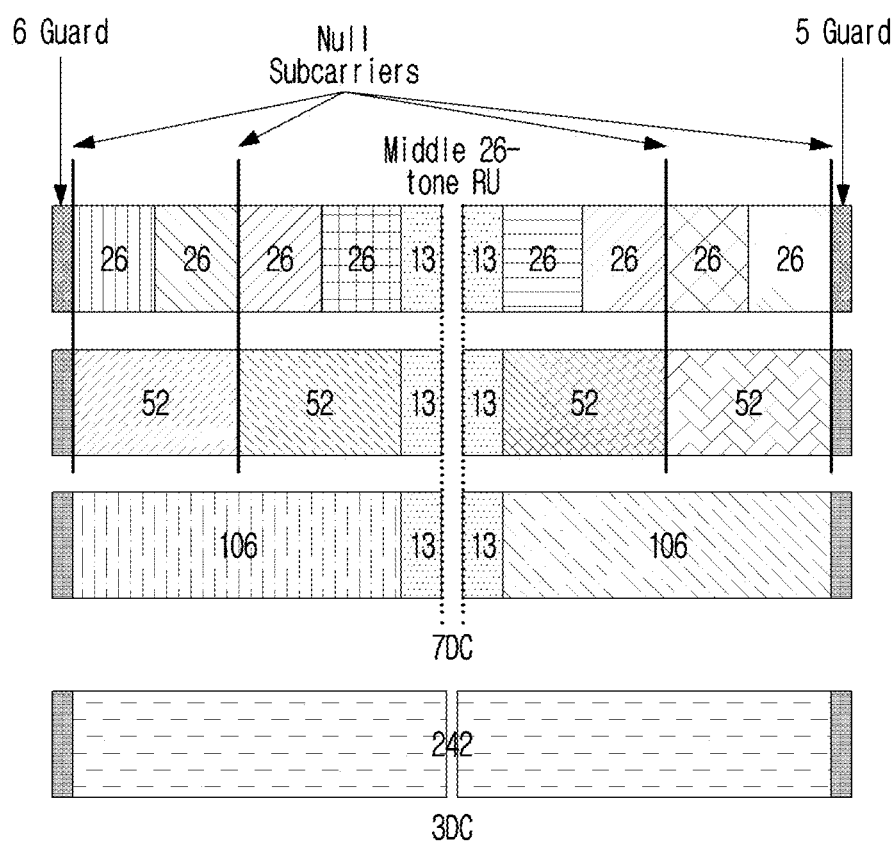
FIGS. 8 to 10 are diagrams for explaining examples of resource units of a WLAN system to which the present disclosure may be applied.
Figure 9:
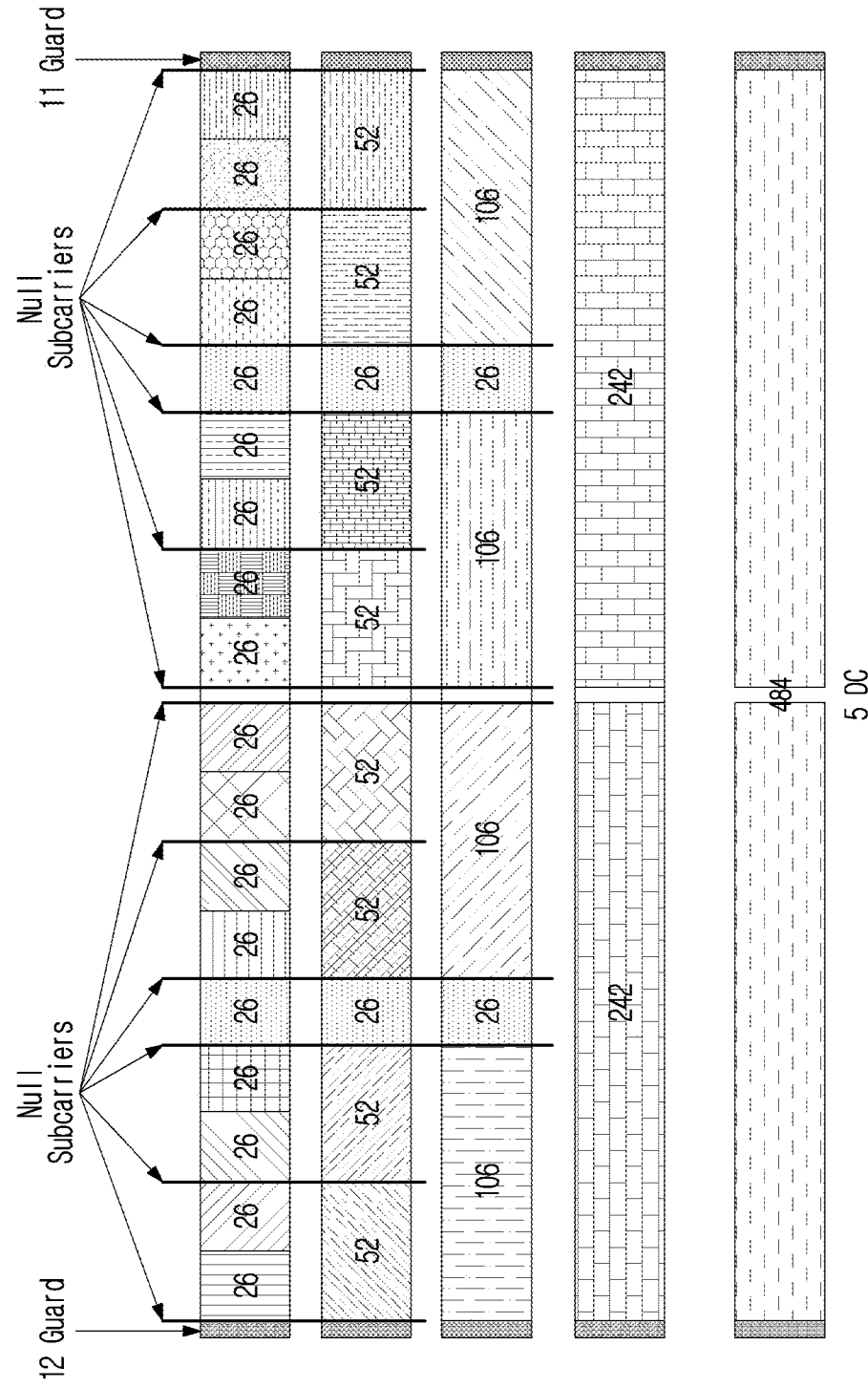
Figure 10:
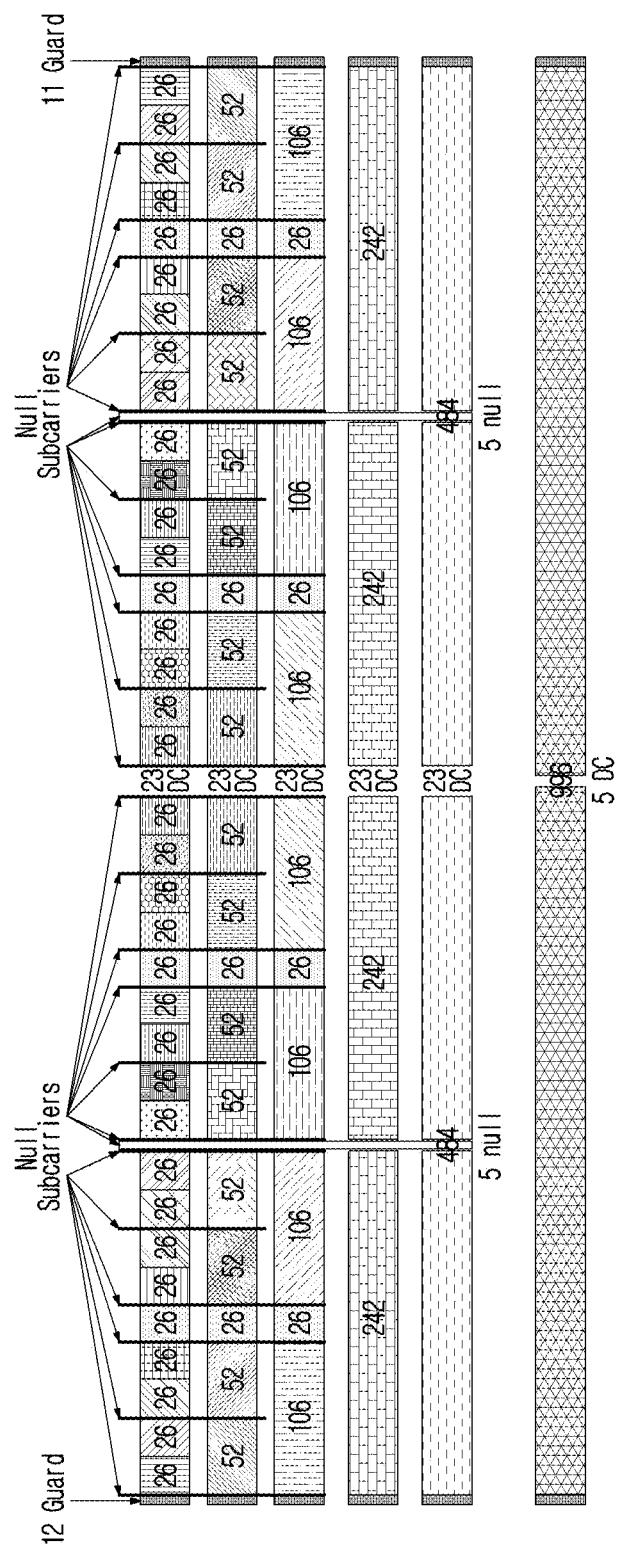

FIGS. 8 to 10 are diagrams for explaining examples of resource units of a WLAN system to which the present disclosure may be applied.

Referring to FIGS. 8 to 10, a resource unit (RU) defined in a wireless LAN system will be described. the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHZ, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHz, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used. FIG. 10 is a diagram illustrating an exemplary allocation of resource units (RUs) used on an 80 MHz band.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHz PPDU, RU allocation of HE PPDUs and EHT PPDUs may be different, and the example of FIG. 10 shows an example of RU allocation for 80 MHz EHT PPDUs. The scheme that 12 tones are used as a guard band in the leftmost band of the 80 MHz band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHz subblocks in FIG. 10. The RU allocation for each 80 MHz subblock may be the same as that of the 80 MHz EHT PPDU of FIG. 10. If the 80 MHz subblock of the 160 MHz or 320 MHz EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2×996+484-tone, 3×996-tone, or 3×996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHz subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. That is, the transmitting STA (e.g., AP) may transmit HE-STF, HE-LTF, and Data field for the first STA through the first RU and transmit HE-STF, HE-LTF, and Data field for the second STA through the second RU, in one MU PPDU, Information on the allocation of RUs may be signaled through HE-SIG-B in the HE PPDU format.

Figure 11:
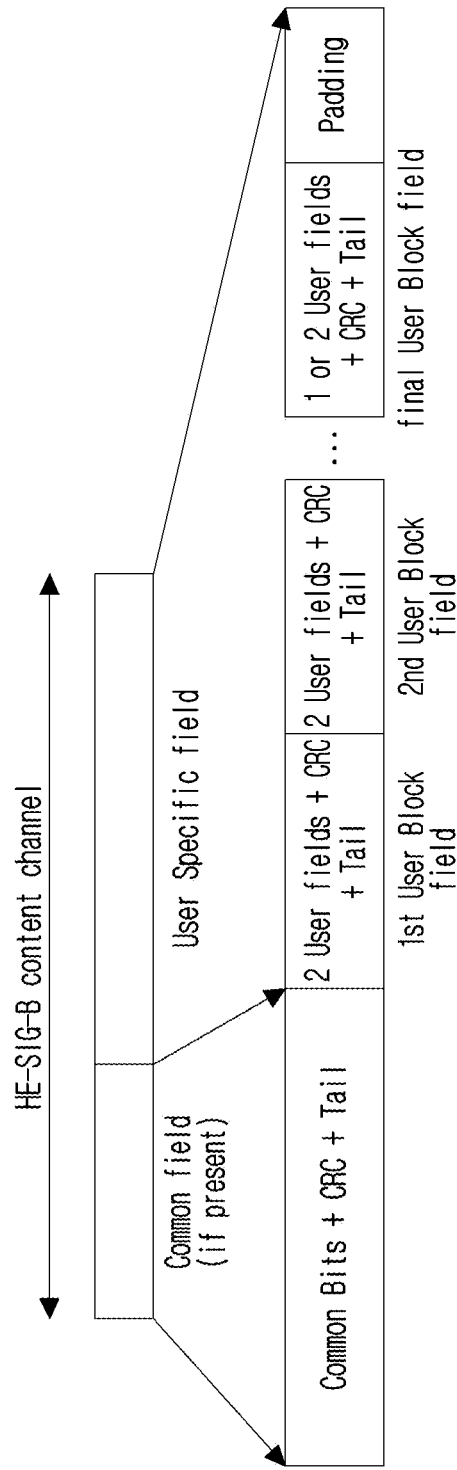
FIG. 11 illustrates an example structure of a HE-SIG-B field.

FIG. 11 illustrates an example structure of a HE-SIG-B field.

As shown, the HE-SIG-B field may include a common field and a user-specific field. If HE-SIG-B compression is applied (e.g., full-bandwidth MU-MIMO transmission), the common field may not be included in HE-SIG-B, and the HE-SIG-B content channel may include only a user-specific field. If HE-SIG-B compression is not applied, the common field may be included in HE-SIG-B.

The common field may include information on RU allocation (e.g., RU assignment, RUs allocated for MU-MIMO, the number of MU-MIMO users (STAs), etc.)

The common field may include N*8 RU allocation subfields. Here, N is the number of subfields, N=1 in the case of 20 or 40 MHz MU PPDU, N=2 in the case of 80 MHz MU PPDU, N=4 in the case of 160 MHz or 80+80 MHz MU PPDU, etc. One 8-bit RU allocation subfield may indicate the size (26, 52, 106, etc.) and frequency location (or RU index) of RUs included in the 20 MHz band.

For example, if a value of the 8-bit RU allocation subfield is 00000000, it may indicate that nine 26-RUs are sequentially allocated in order from the leftmost to the rightmost in the example of FIG. 8, if the value is 00000001, it may indicate that seven 26-RUs and one 52-RU are sequentially allocated in order from leftmost to rightest, and if the value is 00000010, it may indicate that five 26-RUs, one 52-RU, and two 26-RUs are sequentially allocated from the leftmost side to the rightmost side.

As an additional example, if the value of the 8-bit RU allocation subfield is 01000y2y1y0, it may indicate that one 106-RU and five 26-RUs are sequentially allocated from the leftmost to the rightmost in the example of FIG. 8. In this case, multiple users/STAs may be allocated to the 106-RU in the MU-MIMO scheme. Specifically, up to 8 users/STAs may be allocated to the 106-RU, and the number of users/STAs allocated to the 106-RU is determined based on 3-bit information (i.e., y2y1y0). For example, when the 3-bit information (y2y1y0) corresponds to a decimal value N, the number of users/STAs allocated to the 106-RU may be N+1.

Basically, one user/STA may be allocated to each of a plurality of RUs, and different users/STAs may be allocated to different RUs. For RUs larger than a predetermined size (e.g., 106, 242, 484, 996-tones, . . . ), a plurality of users/STAs may be allocated to one RU, and MU-MIMO scheme may be applied for the plurality of users/STAs.

The set of user-specific fields includes information on how all users (STAs) of the corresponding PPDU decode their payloads. User-specific fields may contain zero or more user block fields. The non-final user block field includes two user fields (i.e., information to be used for decoding in two STAs). The final user block field contains one or two user fields. The number of user fields may be indicated by the RU allocation subfield of HE-SIG-B, the number of symbols of HE-SIG-B, or the MU-MIMO user field of HE-SIG-A. A User-specific field may be encoded separately from or independently of a common field.

Figure 12:
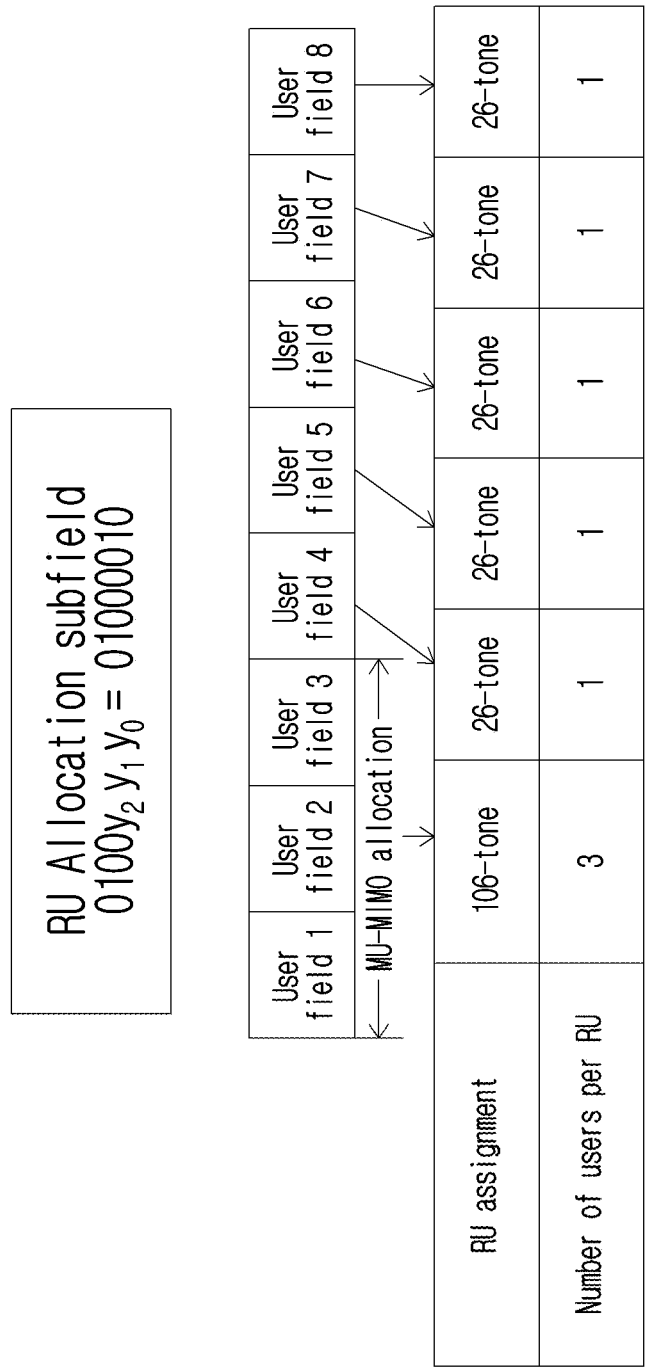
FIG. 12 is a diagram for explaining a MU-MIMO method in which a plurality of users/STAs are allocated to one RU.

FIG. 12 is a diagram for explaining a MU-MIMO method in which a plurality of users/STAs are allocated to one RU.

In the example of FIG. 12, it is assumed that the value of the RU allocation subfield is 01000010. This corresponds to the case where y2y1y0=010 in 01000y2y1y0. 010 corresponds to 2 in decimal (i.e., N=2) and may indicate that 3 (=N+1) users are allocated to one RU. In this case, one 106-RU and five 26-RUs may be sequentially allocated from the leftmost side to the rightmost side of a specific 20 MHz band/channel. Three users/STAs may be allocated to the 106-RU in a MU-MIMO manner. As a result, a total of 8 users/STAs are allocated to the 20 MHz band/channel, and the user-specific field of HE-SIG-B may include 8 user fields (i.e., 4 user block fields). Eight user fields may be assigned to RUs as shown in FIG. 12.

The user field may be constructed based on two formats. The user field for a MU-MIMO allocation may be constructed with a first format, and the user field for non-MU-MIMO allocation may be constructed with a second format. Referring to the example of FIG. 12, user fields 1 to 3 may be based on the first format, and user fields 4 to 8 may be based on the second format. The first format and the second format may contain bit information of the same length (e.g., 21 bits).

The user field of the first format (i.e., format for MU-MIMO allocation) may be constructed as follows. For example, out of all 21 bits of one user field, B0-B10 includes the user's identification information (e.g., STA-ID, AID, partial AID, etc.), B11-14 includes spatial configuration information such as the number of spatial streams for the corresponding user, B15-B18 includes Modulation and Coding Scheme (MCS) information applied to the Data field of the corresponding PPDU, B19 is defined as a reserved field, and B20 may include information on a coding type (e.g., binary convolutional coding (BCC) or low-density parity check (LDPC)) applied to the Data field of the corresponding PPDU.

The user field of the second format (i.e., the format for non-MU-MIMO allocation) may be constructed as follows. For example, out of all 21 bits of one user field, B0-B10 includes the user's identification information (e.g., STA-ID, AID, partial AID, etc.), B11-13 includes information on the number of spatial streams (NSTS) applied to the corresponding RU, B14 includes information indicating whether beamforming is performed (or whether a beamforming steering matrix is applied), B15-B18 includes Modulation and Coding Scheme (MCS) information applied to the Data field of the corresponding PPDU, B19 includes information indicating whether DCM (dual carrier modulation) is applied, and B20 may include information on a coding type (e.g., BCC or LDPC) applied to the Data field of the corresponding PPDU.

MCS, MCS information, MCS index, MCS field, and the like used in the present disclosure may be indicated by a specific index value. For example, MCS information may be indicated as index 0 to index 11. MCS information includes information on constellation modulation type (e.g., BPSK, QPSK, 16-QAM, 64-QAM, 256-QAM, 1024-QAM, etc.), and coding rate (e.g., 1/2, 2/3, 3/4, 5/6, etc.). Information on a channel coding type (e.g., BCC or LDPC) may be excluded from the MCS information.

Figure 13:
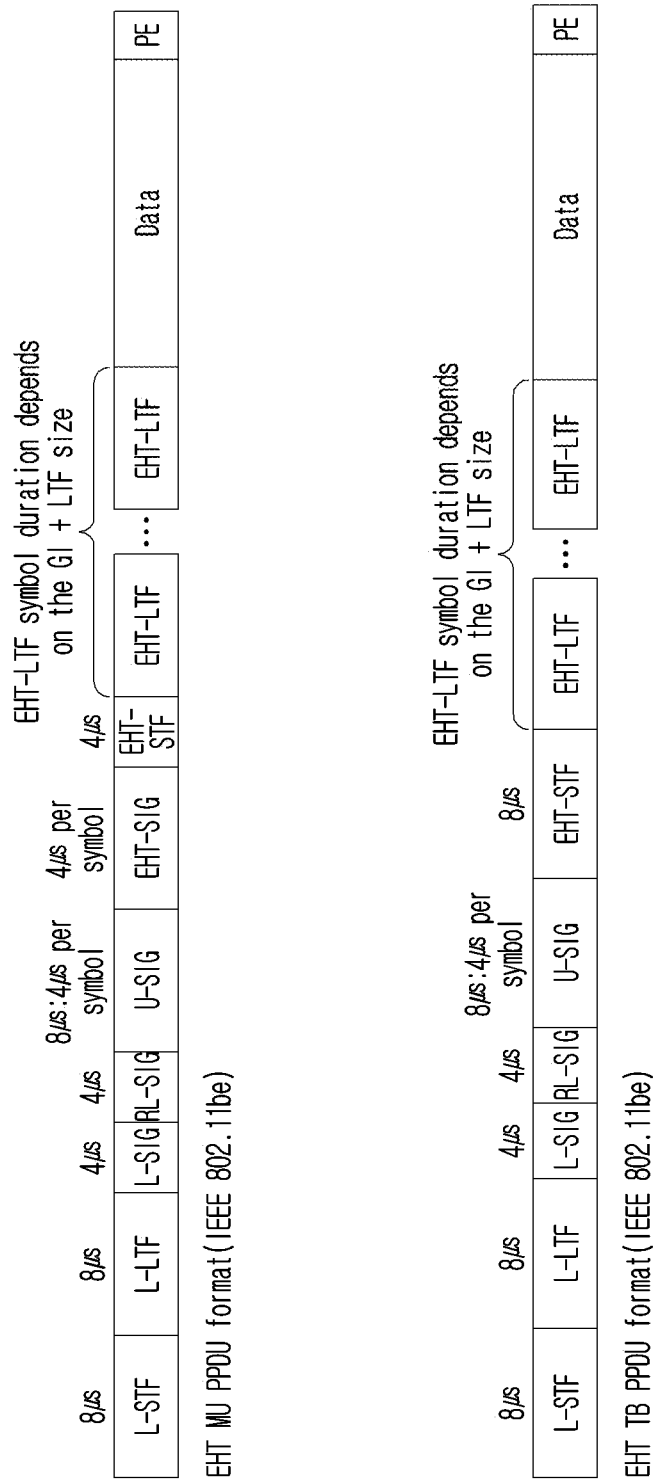
FIG. 13 illustrates an example of a PPDU format to which the present disclosure may be applied.

FIG. 13 illustrates an example of a PPDU format to which the present disclosure may be applied.

The PPDU of FIG. 13 may be referred as various names such as an EHT PPDU, a transmitted PPDU, a received PPDU, a first type or an Nth type PPDU. For example, the PPDU or EHT PPDU of the present disclosure may be referred as various names such as a transmission PPDU, a reception PPDU, a first type or an Nth type PPDU. In addition, the EHT PPU may be used in an EHT system and/or a new wireless LAN system in which the EHT system is improved.

The EHT MU PPDU of FIG. 13 corresponds to a PPDU carrying one or more data (or PSDUs) for one or more users. That is, the EHT MU PPDU may be used for both SU transmission and MU transmission. For example, the EHT MU PPDU may correspond to a PPDU for one receiving STA or a plurality of receiving STAs.

In the EHT TB PPDU of FIG. 13, the EHT-SIG is omitted compared to the EHT MU PPDU. Upon receiving a trigger for UL MU transmission (eg, a trigger frame or TRS), the STA may perform UL transmission based on the EHT TB PPDU format.

In the example of the EHT PPDU format of FIG. 13, L-STF to EHT-LTF correspond to a preamble or a physical preamble, and may be generated/transmitted/received/acquired/decoded in the physical layer.

A Subcarrier frequency spacing of L-STF, L-LTF, L-SIG, RL-SIG, Universal SIGNAL (U-SIG), EHT-SIG field (these are referred to as pre-EHT modulated fields) may be set to 312.5 kHz. A subcarrier frequency spacing of the EHT-STF, EHT-LTF, Data, and PE field (these are referred to as EHT modulated fields) may be set to 78.125 kHz. That is, the tone/subcarrier index of L-STF, L-LTF, L-SIG, RL-SIG, U-SIG, and EHT-SIG field may be indicated in units of 312.5 kHz, and the tone/subcarrier index of EHT-STF, EHT-LTF, Data, and PE field may be indicated in units of 78.125 kHz.

The L-LTF and L-STF of FIG. 13 may be constructed identically to the corresponding fields of the PPDU described in FIGS. 6 to 7.

The L-SIG field of FIG. 13 may be constructed with 24 bits and may be used to communicate rate and length information. For example, the L-SIG field includes a 4-bit Rate field, a 1-bit Reserved bit, a 12-bit Length field, a 1-bit Parity field, and a 6-bit Tail field may be included. For example, the 12-bit Length field may include information on a time duration or a length of the PPDU. For example, a value of the 12-bit Length field may be determined based on the type of PPDU. For example, for a non-HT, HT, VHT, or EHT PPDU, the value of the Length field may be determined as a multiple of 3. For example, for the HE PPDU, the value of the Length field may be determined as a multiple of 3+1 or a multiple of 3+2.

For example, the transmitting STA may apply BCC encoding based on a coding rate of 1/2 to 24-bit information of the L-SIG field. Thereafter, the transmitting STA may obtain 48-bit BCC coded bits. BPSK modulation may be applied to 48-bit coded bits to generate 48 BPSK symbols. The transmitting STA may map 48 BPSK symbols to any location except for a pilot subcarrier (e,g,, {subcarrier index −21, −7, +7, +21}) and a DC subcarrier (e.g., {subcarrier index 0}). As a result, 48 BPSK symbols may be mapped to subcarrier indices −26 to −22, −20 to −8, −6 to −1, +1 to +6, +8 to +20, and +22 to +26. The transmitting STA may additionally map the signals of {−1, −1, −1, 1} to the subcarrier index {−28, −27, +27, +28}. The above signal may be used for channel estimation in the frequency domain corresponding to {−28, −27, +27, +28}.

The transmitting STA may construct RL-SIG which is constructed identically to L-SIG. For RL-SIG, BPSK modulation is applied. The receiving STA may recognize that the received PPDU is a HE PPDU or an EHT PPDU based on the existence of the RL-SIG.

After the RL-SIG of FIG. 13, a Universal SIG (U-SIG) may be inserted. The U-SIG may be referred as various names such as a first SIG field, a first SIG, a first type SIG, a control signal, a control signal field, and a first (type) control signal, etc.

The U-SIG may include N-bit information and may include information for identifying the type of EHT PPDU. For example, U-SIG may be configured based on two symbols (e.g., two consecutive OFDM symbols). Each symbol (e.g., OFDM symbol) for the U-SIG may have a duration of 4 us, and the U-SIG may have a total 8 us duration. Each symbol of the U-SIG may be used to transmit 26 bit information. For example, each symbol of the U-SIG may be transmitted and received based on 52 data tones and 4 pilot tones.

Through the U-SIG (or U-SIG field), for example, A bit information (e.g., 52 un-coded bits) may be transmitted, the first symbol of the U-SIG (e.g., U-SIG-1) may transmit the first X bit information (e.g., 26 un-coded bits) of the total A bit information, and the second symbol of the U-SIG (e.g., U-SIG-2) may transmit the remaining Y-bit information (e.g., 26 un-coded bits) of the total A-bit information. For example, the transmitting STA may obtain 26 un-coded bits included in each U-SIG symbol. The transmitting STA may generate 52-coded bits by performing convolutional encoding (e.g., BCC encoding) based on a rate of R=1/2, and perform interleaving on the 52-coded bits. The transmitting STA may generate 52 BPSK symbols allocated to each U-SIG symbol by performing BPSK modulation on the interleaved 52-coded bits. One U-SIG symbol may be transmitted based on 56 tones (subcarriers) from subcarrier index −28 to subcarrier index +28, except for DC index 0. The 52 BPSK symbols generated by the transmitting STA may be transmitted based on the remaining tones (subcarriers) excluding pilot tones −21, −7, +7, and +21 tones.

For example, the A bit information (e.g., 52 un-coded bits) transmitted by the U-SIG includes a CRC field (e.g., a 4-bit field) and a tail field (e.g., 6 bit-length field). The CRC field and the tail field may be transmitted through the second symbol of the U-SIG. The CRC field may be constructed based on 26 bits allocated to the first symbol of U-SIG and 16 bits remaining except for the CRC/tail field in the second symbol, and may be constructed based on a conventional CRC calculation algorithm. In addition, the tail field may be used to terminate the trellis of the convolution decoder, and for example, the tail field may be set to 0.

A bit information (e.g., 52 un-coded bits) transmitted by the U-SIG (or U-SIG field) may be divided into version-independent bits and version-independent bits. For example, a size of the version-independent bits may be fixed or variable. For example, the version-independent bits may be allocated only to the first symbol of U-SIG, or the version-independent bits may be allocated to both the first symbol and the second symbol of U-SIG. For example, the version-independent bits and the version-dependent bits may be referred as various names such as a first control bit and a second control bit, etc.

For example, the version-independent bits of the U-SIG may include a 3-bit physical layer version identifier (PHY version identifier). For example, the 3-bit PHY version identifier may include information related to the PHY version of the transmitted/received PPDU. For example, the first value of the 3-bit PHY version identifier may indicate that the transmission/reception PPDU is an EHT PPDU. In other words, when transmitting the EHT PPDU, the transmitting STA may set the 3-bit PHY version identifier to a first value. In other words, the receiving STA may determine that the received PPDU is an EHT PPDU based on the PHY version identifier having the first value.

For example, the version-independent bits of U-SIG may include a 1-bit UL/DL flag field. A first value of the 1-bit UL/DL flag field is related to UL communication, and a second value of the UL/DL flag field is related to DL communication.

For example, the version-independent bits of the U-SIG may include information on the length of a transmission opportunity (TXOP) and information on a BSS color ID.

For example, if the EHT PPDU is classified into various types (e.g., EHT PPDU related to SU mode, EHT PPDU related to MU mode, EHT PPDU related to TB mode, EHT PPDU related to Extended Range transmission, etc.), information on the type of EHT PPDU may be included in the version-dependent bits of the U-SIG.

For example, the U-SIG may include information on 1) a bandwidth field containing information on a bandwidth, 2) a field containing information on a MCS scheme applied to EHT-SIG, 3) an indication field containing information related to whether the DCM technique is applied to the EHT-SIG, 4) a field containing information on the number of symbols used for EHT-SIG, 5) a field containing information on whether EHT-SIG is constructed over all bands, 6) a field containing information on the type of EHT-LTF/STF, and 7) a field indicating the length of EHT-LTF and CP length.

Preamble puncturing may be applied to the PPDU of FIG. 13. Preamble puncturing means that puncturing for some bands (e.g., a secondary 20 MHz band) among all bands of a PPDU is applied. For example, when a 80 MHz PPDU is transmitted, a STA may apply puncturing to a secondary 20 MHz band of a 80 MHz band and transmit a PPDU only through a primary 20 MHz band and a secondary 40 MHz band.

For example, a pattern of preamble puncturing may be configured in advance. For example, when a first puncturing pattern is applied, puncturing may be applied only to a secondary 20 MHz band within a 80 MHz band. For example, when a second puncturing pattern is applied, puncturing may be applied to only any one of two secondary 20 MHz bands included in a secondary 40 MHz band within a 80 MHz band. For example, when a third puncturing pattern is applied, puncturing may be applied to only a secondary 20 MHz band included in a primary 80 MHz band within a 160 MHz band (or a 80+80 MHz band). For example, when a fourth puncturing pattern is applied, a primary 40 MHz band included in a primary 80 MHz band within a 160 MHz band (or a 80+80 MHz band) is present and puncturing may be applied to at least one 20 MHz channel which does not belong to a primary 40 MHz band.

Information on preamble puncturing applied to a PPDU may be included in a U-SIG and/or a EHT-SIG. For example, the first field of the U-SIG may include information on the contiguous bandwidth of the PPDU, and the second field of the U-SIG may include information on preamble puncturing applied to the PPDU.

For example, the U-SIG and the EHT-SIG may include information on preamble puncturing based on the following method. If the bandwidth of the PPDU exceeds 80 MHZ, the U-SIG may be individually constructed in units of 80 MHz. For example, if the bandwidth of the PPDU is 160 MHZ, the PPDU may include a first U-SIG for a first 80 MHz band and a second U-SIG for a second 80 MHz band. In this case, the first field of the first U-SIG includes information on the 160 MHz bandwidth, and the second field of the first U-SIG includes information on preamble puncturing applied to the first 80 MHz band (i.e., information on a preamble puncturing pattern). In addition, the first field of the second U-SIG includes information on a 160 MHz bandwidth, and the second field of the second U-SIG includes information on preamble puncturing applied to a second 80 MHz band (i.e., information on a preamble puncturing pattern). The EHT-SIG following the first U-SIG may include information on preamble puncturing applied to the second 80 MHz band (i.e., information on a preamble puncturing pattern), and the EHT-SIG following the second U-SIG may include information on preamble puncturing applied to the first 80 MHz band (i.e., information on a preamble puncturing pattern).

Additionally or alternatively, the U-SIG and the EHT-SIG may include information on preamble puncturing based on the following method. The U-SIG may include information on preamble puncturing for all bands (i.e., information on a preamble puncturing pattern). That is, EHT-SIG does not include information on preamble puncturing, and only U-SIG may include information on preamble puncturing (ie, information on a preamble puncturing pattern).

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

The EHT-SIG of FIG. 13 may include control information for the receiving STA. EHT-SIG may be transmitted through at least one symbol, and one symbol may have a length of 4 us. Information on the number of symbols used for EHT-SIG may be included in U-SIG.

The EHT-SIG may include technical features of HE-SIG-B described through FIGS. 11 and 12. For example, EHT-SIG, like the example of FIG. 8, may include a common field and a user-specific field. The Common field of the EHT-SIG may be omitted, and the number of user-specific fields may be determined based on the number of users.

As in the example of FIG. 11, the common field of the EHT-SIG and the user-specific field of the EHT-SIG may be coded separately. One user block field included in the user-specific field may contain information for two user fields, but the last user block field included in the user-specific field may contain one or two user fields. That is, one user block field of the EHT-SIG may contain up to two user fields. As in the example of FIG. 12, each user field may be related to MU-MIMO allocation or non-MU-MIMO allocation.

In the same way as in the example of FIG. 11, the common field of the EHT-SIG may include a CRC bit and a Tail bit, The length of the CRC bit may be determined as 4 bits, and the length of the tail bit is determined by 6 bits and may be set to 000000.

As in the example of FIG. 11, the common field of the EHT-SIG may include RU allocation information. RU allocation information may mean information on the location of an RU to which a plurality of users (i.e., a plurality of receiving STAs) are allocated. RU allocation information may be configured in units of 8 bits (or N bits).

A mode in which a common field of EHT-SIG is omitted may be supported. The mode in which the common field of the EHT-SIG is omitted may be referred as a compressed mode. When the compressed mode is used, a plurality of users (i.e., a plurality of receiving STAs) of the EHT PPDU may decode the PPDU (e.g., the data field of the PPDU) based on non-OFDMA. That is, a plurality of users of the EHT PPDU may decode a PPDU (e.g., a data field of the PPDU) received through the same frequency band. When a non-compressed mode is used, multiple users of the EHT PPDU may decode the PPDU (e.g., the data field of the PPDU) based on OFDMA. That is, a plurality of users of the EHT PPDU may receive the PPDU (e.g., the data field of the PPDU) through different frequency bands.

EHT-SIG may be constructed based on various MCS scheme. As described above, information related to the MCS scheme applied to the EHT-SIG may be included in the U-SIG. The EHT-SIG may be constructed based on the DCM scheme. For example, a first modulation technique may be applied to the contiguous half tones of N data tones (e.g., 52 data tones) allocated for a EHT-SIG and a second modulation technique may be applied to the remaining contiguous half tones. In other words, a transmitting STA may modulate specific control information into a first symbol based on a first modulation technique and allocate it to contiguous half tones and may modulate the same control information into a second symbol based on a second modulation technique and allocate it to the remaining contiguous half tones. As described above, information related to whether the DCM scheme is applied to the EHT-SIG (e.g., a 1-bit field) may be included in the U-SIG. The EHT-STF of FIG. 13 may be used to enhance automatic gain control (AGC) estimation in a MIMO environment or an OFDMA environment. The EHT-LTF of FIG. 13 may be used to estimate a channel in a MIMO environment or an OFDMA environment.

Information on the type of STF and/or LTF (including information on a guard interval (GI) applied to LTF) may be included in the U-SIG field and/or the EHT-SIG field of FIG. 13.

The PPDU (i.e., EHT PPDU) of FIG. 13 may be constructed based on an example of RU allocation of FIGS. 8 to 10.

For example, a EHT PPDU transmitted on a 20 MHz band, that is, a 20 MHz EHT PPDU may be constructed based on the RU of FIG. 8. That is, a RU location of EHT-STF, EHT-LTF, and data field included in the EHT PPDU may be determined as shown in FIG. 8. A EHT PPDU transmitted on a 40 MHz band, that is, a 40 MHz EHT PPDU may be constructed based on the RU of FIG. 9. That is, a RU location of EHT-STF, EHT-LTF, and data field included in the EHT PPDU may be determined as shown in FIG. 9.

The EHT PPDU transmitted on the 80 MHz band, that is, the 80 MHz EHT PPDU may be constructed based on the RU of FIG. 10. That is, a RU location of EHT-STF, EHT-LTF, and data field included in the EHT PPDU may be determined as shown in FIG. 10. The tone-plan for 80 MHz in FIG. 10 may correspond to two repetitions of the tone-plan for 40 MHz in FIG. 9.

The tone-plan for 160/240/320 MHz may be configured in the form of repeating the pattern of FIG. 9 or 10 several times.

The PPDU of FIG. 13 may be identified as an EHT PPDU based on the following method.

The receiving STA may determine the type of the received PPDU as the EHT PPDU based on the following. For example, when 1) the first symbol after the L-LTF signal of the received PPDU is BPSK, 2) RL-SIG in which the L-SIG of the received PPDU is repeated is detected, and 3) the result of applying the modulo 3 calculation to the value of the Length field of the L-SIG of the received PPDU (i.e., the remainder after dividing by 3) is detected as 0, the received PPDU may be determined as a EHT PPDU. When the received PPDU is determined to be an EHT PPDU, the receiving STA may determine the type of the EHT PPDU based on bit information included in symbols subsequent to the RL-SIG of FIG. 13. In other words, the receiving STA may determine the received PPDU as a EHT PPDU, based on 1) the first symbol after the L-LTF signal, which is BSPK, 2) RL-SIG contiguous to the L-SIG field and identical to the L-SIG, and 3) L-SIG including a Length field in which the result of applying modulo 3 is set to 0.

For example, the receiving STA may determine the type of the received PPDU as the HE PPDU based on the following. For example, when 1) the first symbol after the L-LTF signal is BPSK, 2) RL-SIG in which L-SIG is repeated is detected, and 3) the result of applying modulo 3 to the length value of L-SIG is detected as 1 or 2, the received PPDU may be determined as a HE PPDU.

For example, the receiving STA may determine the type of the received PPDU as non-HT, HT, and VHT PPDU based on the following. For example, when 1) the first symbol after the L-LTF signal is BPSK and 2) RL-SIG in which L-SIG is repeated is not detected, the received PPDU may be determined as non-HT, HT, and VHT PPDU. In addition, although a receiving STA detects repetition of a RL-SIG, when a result of applying modulo 3 to a length value of a L-SIG is detected as 0, a received PPDU may be determined as a non-HT, a HT and a VHT PPDU.

The PPDU of FIG. 13 may be used to transmit and receive various types of frames. For example, the PPDU of FIG. 13 may be used for (simultaneous) transmission and reception of one or more of a control frame, a management frame, or a data frame.

Hereinafter, a target wake time (TWT) is described.

A TWT is a power saving (PS) technology which may improve energy efficiency of non-AP STAs by defining a service period (SP) between an AP and non-AP STA and sharing information about a SP each other to reduce media contention. A STA which performs a request/a suggest/a demand, etc. in a TWT setup step may be referred to as a TWT requesting STA. In addition, an AP which responds to a corresponding request such as Accept/Reject, etc. may be referred to as a TWT responding STA. A setup step may include a TWT request for an AP of a STA, a type of a TWT operation performed and a process of determining/defining a frame type transmitted or received. A TWT operation may be divided into an individual TWT and a broadcast TWT.

Figure 14:
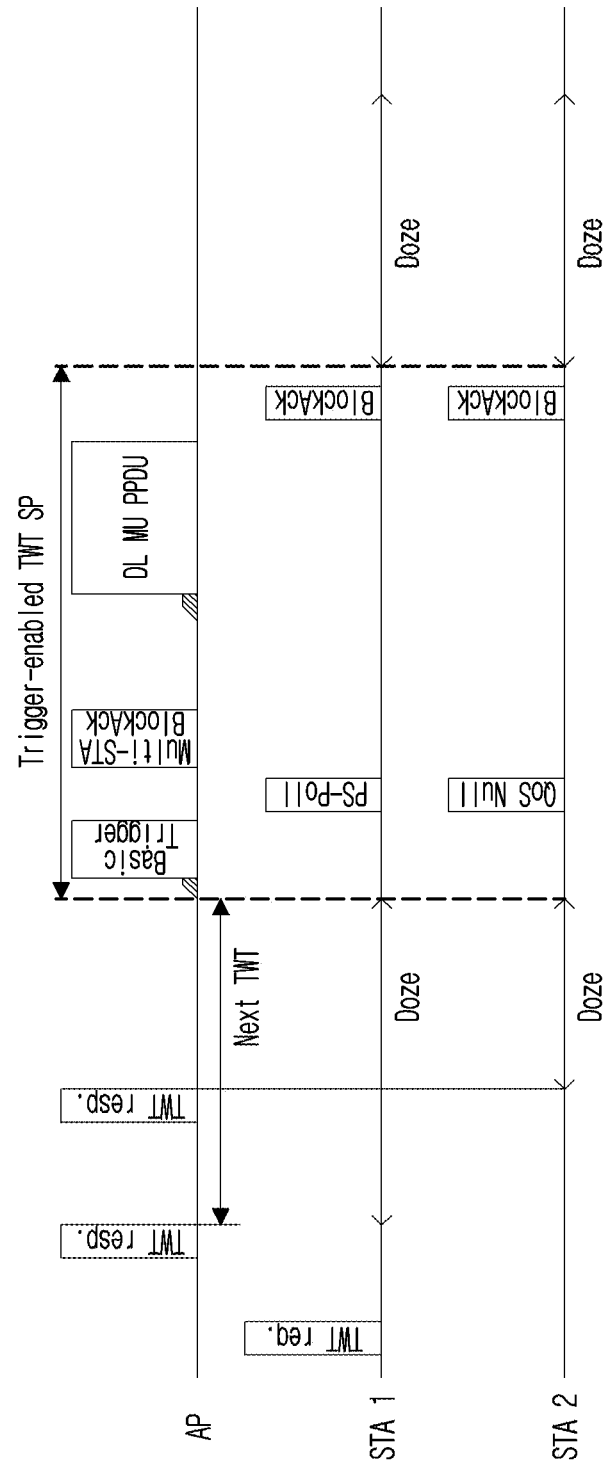
FIG. 14 is a diagram for describing an example of an individual TWT operation to which the present disclosure may be applied.

FIG. 14 is a diagram for describing an example of an individual TWT operation to which the present disclosure may be applied.

An individual TWT is a mechanism that an AP and non-AP STA perform data exchange after performing negotiation for an awake/doze status of a non-AP STA through transmission or reception of a TWT request/response frame. In an example of FIG. 14, an AP and STA1 may form a trigger-enabled TWT agreement through a TWT request frame and a TWT response frame. Here, a method used by STA1 is a solicited TWT method, which is a method that when STA1 transmits a TWT request frame to an AP, STA1 receives information for a TWT operation from an AP through a TWT response frame. On the other hand, STA2 which performs an unsolicited TWT method may receive information on a trigger-enabled TWT agreement configuration from an AP through an unsolicited TWT response. Specifically, STA2 may calculate a next TWT by adding a specific number from a current TWT value. During a trigger-enabled TWT SP, an AP may transmit a trigger frame to STAs. The trigger frame may inform STAs that an AP has buffered data. In response to it, STA1 may inform an AP of its awake status by transmitting a PS-Poll frame. In addition, STA2 may inform an AP of its awake status by transmitting a QoS Null frame. Here, a data frame transmitted by STA1 and STA2 may be a frame in a TB PPDU form. An AP which confirmed a status of STA1 and STA2 may transmit a DL MU PPDU to awake STAs. When a corresponding TWT SP expires, STA1 and STA2 may switch to a doze status.

Figure 15:
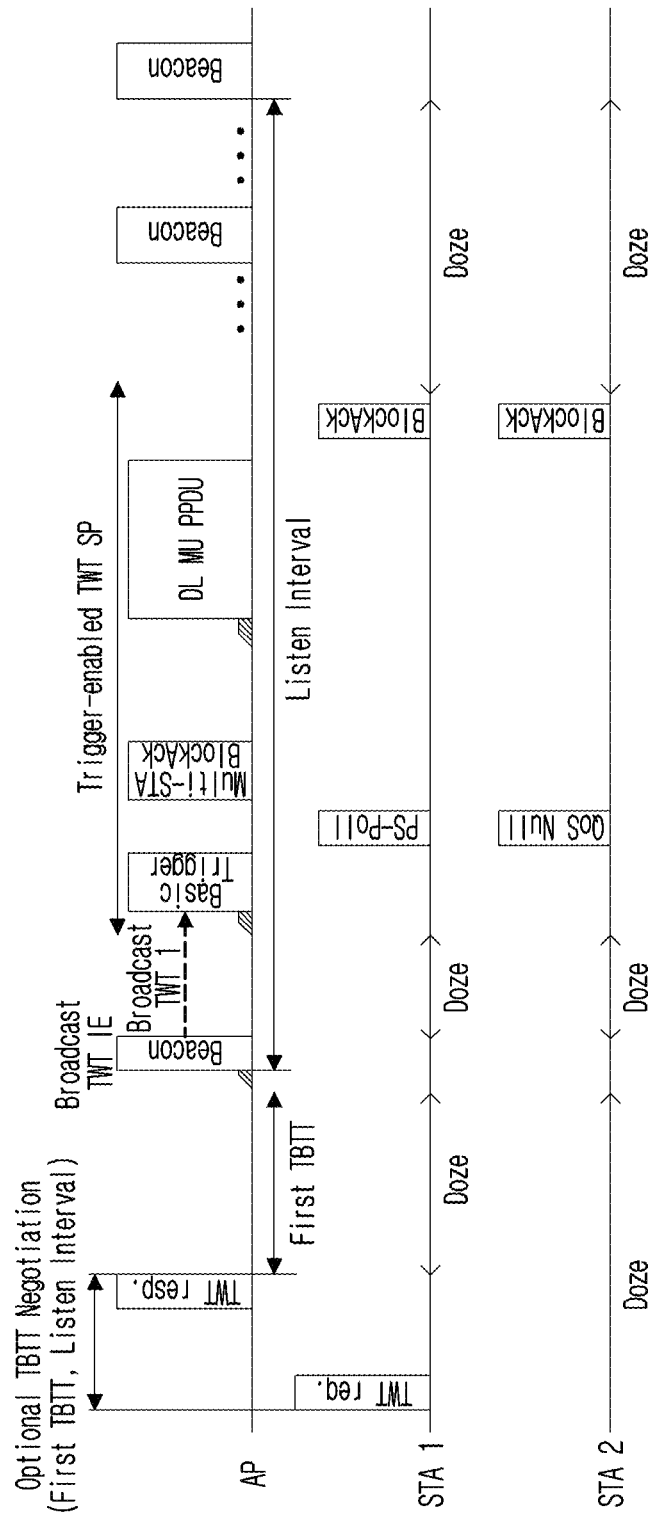
FIG. 15 is a diagram for describing an example of a broadcast TWT operation to which the present disclosure may be applied.

FIG. 15 is a diagram for describing an example of a broadcast TWT operation to which the present disclosure may be applied.

A broadcast TWT is a TWT that a non-AP STA (or a TWT scheduling STA) acquires information on a target beacon transmission time (TBTT) and a listen interval, etc. by transmitting or receiving a TWT request/response frame with an AP (or a TWT scheduled STA). Here, a negotiation operation for a TBTT may be performed. Based on it, an AP may define a frame which will include scheduling information of a TWT through a beacon frame. In FIG. 15, STA1 performs a solicited TWT operation and STA2 performs an unsolicited TWT operation. An AP may transmit a DL MU PPDU after confirming an awake status of STAs through a trigger transmitted by an AP. It may be the same as a process of an individual TWT. In a broadcast TWT, a trigger-enabled TWT SP including a beacon frame may be repeated several times at a certain interval.

Delivery of TWT information may be performed through a TWT information frame and a TWT information element.

FIG. 16 is a diagram for describing an example of a TWT information element format.

A TWT information frame is transmitted by a STA to request or deliver information on a TWT agreement and is transmitted by one of STAs in an existing TWT agreement. An action frame of a TWT Information frame includes a TWT information field. A TWT Information field may include a 3-bit TWT flow identifier subfield, a 1-bit response requested subfield, a 1-bit next TWT request subfield, a 2-bit next TWT subfield size subfield, a 1-bit all TWT subfield and a 0/32/48/64-bit next TWT subfield.

A size of a TWT Information field is variable according to a size of a next TWT field. A TWT flow identifier subfield includes an identifier of a TWT flow that TWT information is requested or provided. A TWT flow identifier subfield may be reserved when a value of all TWT subfields is 1.

A response requested subfield may indicate whether a STA transmitting a frame including a TWT information field requests that a TWT information frame will be transmitted in response to a corresponding frame. When a response requested subfield is configured as 0, a receiving STA may be requested not to transmit a TWT information frame in response to a corresponding frame. When a response requested subfield is configured as 1, a receiving STA may be requested to transmit a TWT information frame in response to a corresponding frame.

When a next TWT request subfield is configured as 1, it may indicate that a TWT information frame is a request for delivery of a TWT information frame including a next TWT field of a non-zero length. Otherwise, a next TWT request subfield may be configured as 0.

When a value of a next TWT subfield size subfield is 0, 1, 2, and 3, it may indicate that a size of a next TWT subfield is 0, 32, 48, and 64, respectively.

When all TWT subfields are configured as 1, it may indicate that a TWT information frame reschedules all TWTs. Otherwise, all TWT subfields may be configured as 0.

A next TWT subfield may have a variable length according to a value of a next TWT subfield size. A value included in a next TWT subfield may have a value corresponding to the least significant portion of a timing synchronization function (TSF) in a next TWT for a TWT specified by a TWT flow identifier subfield.

Figure 17:
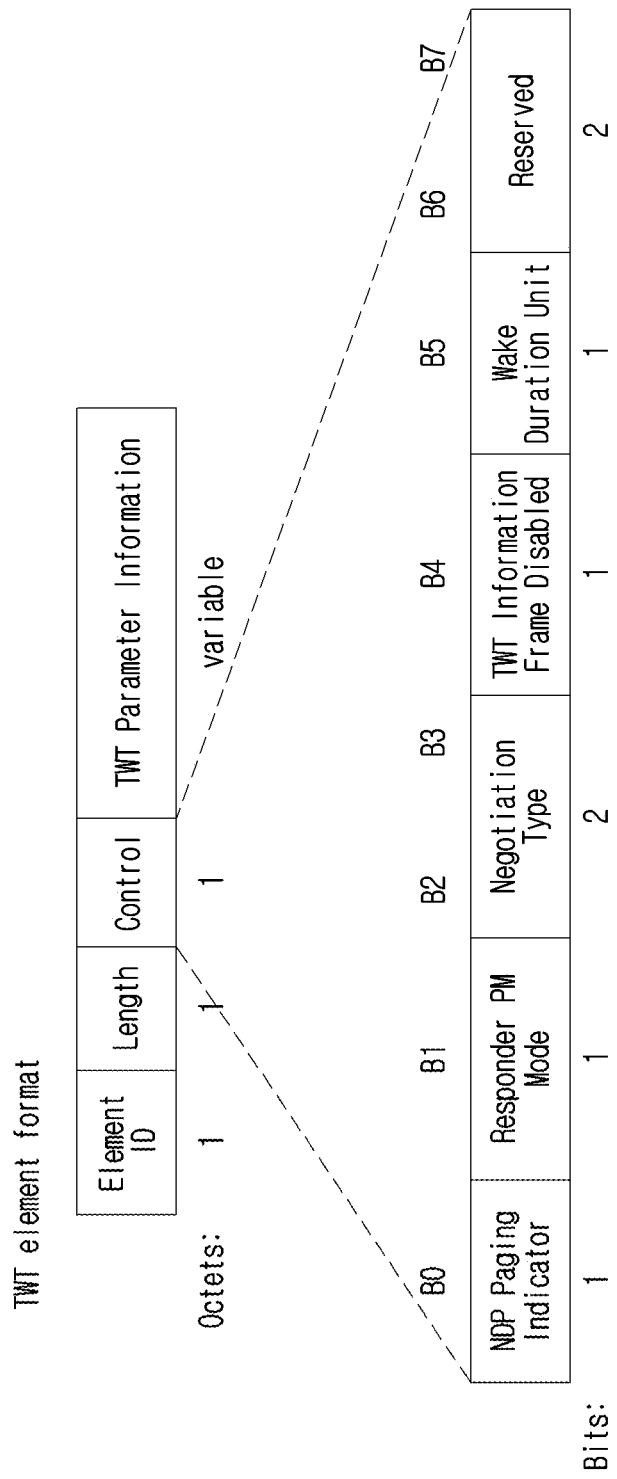
FIG. 17 is a diagram for describing an example of a TWT information element format.

FIG. 17 is a diagram for describing an example of a TWT information element format.

A TWT information element may be transmitted or received by being included in a beacon, a probe response, a (re)association response frame, etc. A TWT information element may include an element ID field, a length field, a control field and a TWT parameter information field.

A control field of a TWT information element has the same format regardless of an individual TWT and a broadcast TWT.

A NDP paging indication subfield may have a value of 1 when a NDP paging field exists and may have a value of 0 when a NDP paging field does not exist.

A responder PM mode subfield may represent a power management (PM) mode.

A negotiation type subfield may represent whether information included in a TWT element is about a negotiation of broadcast TWT or individual TWT(s) or is about a wake TBTT interval.

For example, when a value of a negotiation type subfield is 0, a TWT subfield is about a future individual TWT SP start time and a TWT element includes one individual TWT parameter set. It may correspond to an individual TWT negotiation between a TWT requesting STA and a TWT responding STA or may correspond to an individual TWT announcement by a TWT responder.

For example, when a value of a negotiation type subfield is 1, a TWT subfield is about a next TBTT time and a TWT element includes one individual TWT parameter set. It may correspond to a wake TBTT and a wake interval negotiation between a TWT scheduled STA and a TWT scheduling AP.

For example, when a value of a negotiation type subfield is 2, a TWT subfield is about a future broadcast TWT SP start time and a TWT element includes at least one broadcast TWT parameter set. It may correspond to providing a broadcast TWT schedule to a TWT scheduled STA by including a TWT element in a broadcast management frame transmitted by a TWT scheduling AP.

For example, when a value of a negotiation type subfield is 3, a TWT subfield is about a future broadcast TWT SP start time and a TWT element includes at least one broadcast TWT parameter set. It may correspond to managing membership of a broadcast TWT schedule by including a TWT element in an individually addressed management frame transmitted by any one of a TWT scheduled STA or a TWT scheduling AP.

When a TWT information frame disabled subfield is configured as 1, it represents that reception of a TWT information frame by a STA is disabled and otherwise, it may be configured as 0.

A wake duration unit subfield represents a unit of a nominal minimum TWT wake duration field. A wake duration unit subfield may be configured as 0 when a unit is 256 us and may be configured as 1 when a unit is a TU. When it is not a HE/EHT STA, a wake duration unit subfield may be configured as 0.

A most significant bit (MSB) of a negotiation type field may correspond to a broadcast field. When the broadcast field is 1, at least one broadcast TWT parameter set may be included in a TWT element. When the broadcast field is 0, only one individual TWT parameter set may be included in a TWT element. A TWT element that the broadcast field is configured as 1 may be referred to as a broadcast TWT element.

Figure 18:
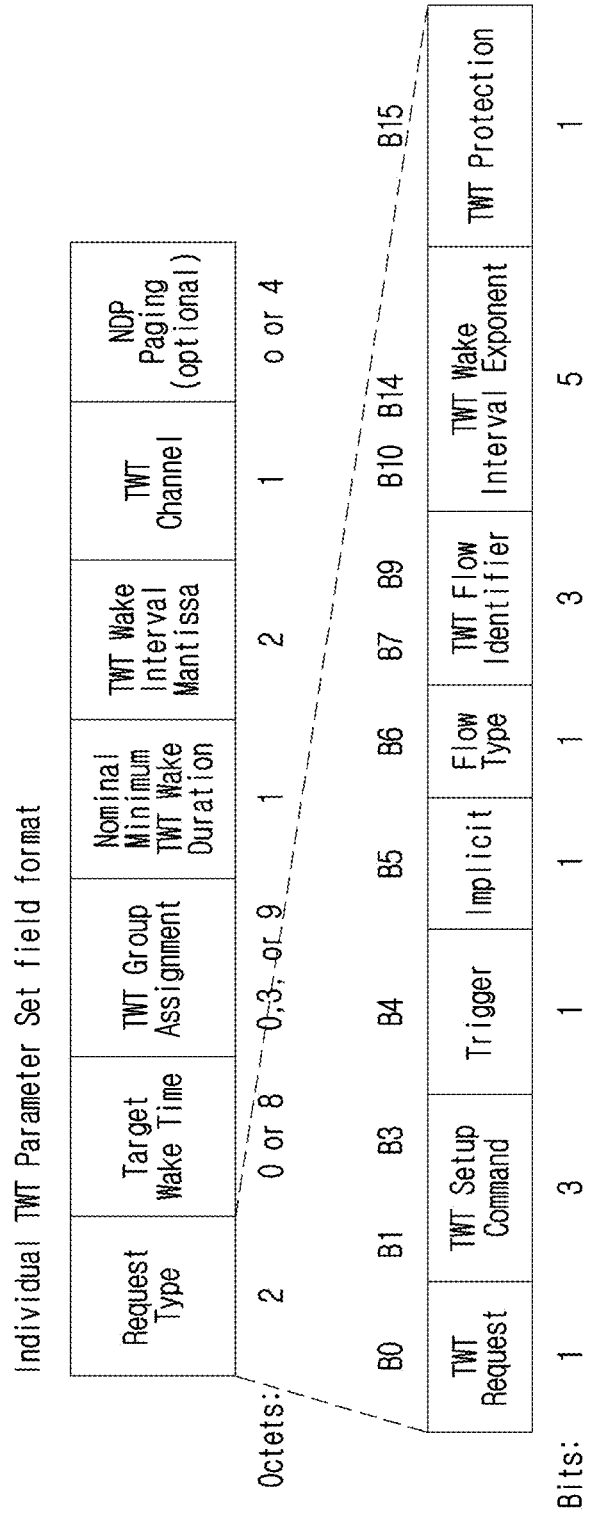
FIG. 18 is a diagram for describing examples of an individual TWT parameter set field format.

FIG. 18 is a diagram for describing examples of an individual TWT parameter set field format. FIG. 19 is a diagram for describing examples of a broadcast TWT parameter set field format.

A TWT parameter information field included in a TWT element in FIG. 17 may have a different configuration according to an individual TWT or a broadcast TWT.

For an individual TWT, a TWT parameter information field in a TWT element includes a single individual TWT parameter set field.

For a broadcast TWT, a TWT parameter information field in a TWT element includes at least one broadcast TWT parameter set field. Each broadcast TWT parameter set may include specific information on one broadcast TWT.

As shown in FIGS. 18 and 19, an individual TWT parameter set field and a broadcast TWT parameter set field include common subfields.

A request type subfield has the same size in an individual TWT parameter set field and a broadcast TWT parameter set field, but may have a different detailed configuration. It is described later.

A target wake time subfield represents a start time of an individual/broadcast TWT SP expected in the future.

A nominal minimum TWT wake duration subfield represents the minimum unit that a TWT requesting STA is expected to be awaken in order to complete frame exchange related to a TWT flow identifier during a TWT wake interval duration. Here, a TWT wake interval may mean an average time between contiguous TWT SPs expected by a TWT requesting STA.

A TWT Wake Interval Mantissa subfield is a binary value of a TWT wake interval value, which may be indicated in microseconds.

In reference to FIG. 18, a TWT group assignment subfield, a TWT channel and a NDP paging subfield are included only in an individual TWT parameter set field.

A TWT group assignment subfield is provided to a TWT requesting STA by including information on a TWT group to which a STA is assigned. A TWT value in a TWT group may be calculated by using corresponding information. A TWT value of a STA may be the same as a value obtained by multiplying a value of a zero offset and a value of a TWT offset by a value of a TWT unit.

A TWT channel subfield represents a bitmap representing an allowed channel. When transmitted by a TWT requesting STA, a TWT channel subfield may include a bitmap representing a channel which is requested by a STA to be used as a temporary basic channel during a TWT SP. When transmitted by a TWT response STA, a TWT channel subfield may include a bitmap representing a channel that a TWT request is allowed.

A NDP paging subfield is optional and may include an identifier of a paged STA, information related to the maximum number of TWT wake intervals between NDP paging frames, etc.

In reference to FIG. 19, a broadcast TWT information (broadcast TWT info) subfield is included only in a broadcast TWT parameter set field. A broadcast TWT information subfield may include a 3-bit reserved bit, a 5-bit broadcast TWT identifier (ID) subfield and a 8-bit broadcast TWT persistence subfield. A broadcast TWT identifier subfield represents a broadcast ID of a specific broadcast TWT that a STA requests participation or provides a TWT parameter according to a value of a TWT setup command subfield of a TWT element. A broadcast TWT persistence subfield represents the number of TBTTs planned on a schedule of a broadcast TWT.

Next, a detailed configuration of a request type subfield is described.

First, a format of a request type subfield of an individual TWT parameter set field is described by referring to FIG. 18.

A TWT request subfield may represent whether it is a requesting STA or a response STA. When that value is 1, it may represent that it is a TWT requesting STA or a scheduling STA and when that value is 0, it may represent that it is a TWT responding STA or a scheduling AP.

A TWT setup command subfield may represent a command such as Request, Suggest, Demand, Accept, Alternate, Dictate, Reject, etc.

A trigger subfield represents whether a trigger frame will be used in a TWT SP. When that value is 1, a trigger may be used and when that value is 0, a trigger may not be used.

An implicit subfield may represent whether it is an implicit TWT or an explicit TWT. When that value is 1, it may represent an implicit TWT and when that value is 0, it may represent an explicit TWT.

A flow type subfield may represent an interaction type between a TWT requesting STA (or a TWT scheduled STA) and a TWT responding STA (or a TWT scheduling AP). When that value is 1, it may mean an announced TWT that a STA transmits a wakeup signal to an AP by transmitting a PS-Poll or automatic power save delivery (APSD) trigger frame before a frame, not a trigger frame, is transmitted from an AP to a STA. When that value is 0, it may mean an unannounced TWT.

A TWT flow identifier subfield may include a 3-bit value which uniquely identifies specific information on a corresponding TWT request in other request performed between the same TWT requesting STA and TWT responding STA pair.

A TWT wake interval exponent subfield may configure a TWT wake interval value in a binary microsecond unit. For an individual TWT, it may mean an interval between individual TWT SPs. A TWT wake interval of a requesting STA may be defined as [TWT Wake Interval Mantissa*2*TWT Wake Interval Exponent].

A TWT protection subfield may represent whether to use a TWT protection mechanism. When that value is 1, a TXOP in a TWT SP may be started with a NAV protection mechanism such as a (MU)RTS/CTS or a CTS-to-self frame and when that value is 0, a NAV protection mechanism may not be applied.

In reference to FIG. 19, some of subfields of a request type subfield of a broadcast TWT parameter set field are common with subfields of a request type subfield of an individual TWT parameter set field, so a description thereof is omitted. Subfields included only in a broadcast TWT parameter set are described below.

A last broadcast parameter set subfield represents whether it is a last broadcast TWT parameter set. When that value is 1, it may represent that it is a last broadcast TWT parameter set and when that value is 0, it may represent that a next broadcast TWT parameter set exists.

A broadcast TWT recommendation subfield may represent recommendations for a frame type transmitted by an AP during a broadcast TWT SP as a value of 1-7.

A last 1 bit of a request type subfield of a broadcast TWT parameter set field may be reserved.

Restricted TWT Related Operation Method

Compared to a cellular wireless communication network system based on radio resource scheduling, it may be relatively difficult to support latency-sensitive traffic in the contention-based medium access method of a wireless LAN system. Restricted TWT (R-TWT) may correspond to one of various methods considered to support transmission and reception of latency-sensitive traffic in a wireless LAN system.

R-TWT may correspond to a special broadcast TWT configured by the AP for low-latency STAs (i.e., STAs that support transmission of latency-sensitive data). Through R-TWT, it is possible to support securing data transmission possibility for low-latency STAs preferentially compared to other STAs. The STA may establish membership in one or more R-TWT schedules for the AP. Here, the R-TWT agreement may be established by the same process as the broadcast TWT agreement, and the broadcast TWT element for this may be defined to include the R-TWT parameter set field. For example, the R-TWT parameter set may refer to a specific broadcast TWT parameter set field that is distinct from other broadcast TWT parameter set fields. That is, the R-TWT parameter set field may correspond to a special case of the broadcast TWT parameter set field.

As a specific example, for R-TWT related operations, an R-TWT Traffic Info subfield may be added to the broadcast TWT parameter set field in FIG. 19 described above.

Specifically, the R-TWT traffic info field may include a traffic info Control subfield, an R-TWT DL TID bitmap subfield, and an R-TWT UL TID bitmap subfield.

Here, the R-TWT DL TID bitmap subfield and the R-TWT UL TID bitmap subfield may specify TID(s) that are identified as latency sensitive traffic streams in downlink/uplink direction by an R-TWT scheduling AP or an R-TWT scheduling STA, respectively. For example, setting the kth bit position of the corresponding bitmap to 1 may indicate that the kth TID is classified as a latency-sensitive traffic stream. Conversely, setting the kth bit position of the corresponding bitmap to 0 may indicate that the kth TID is not classified as a latency-sensitive traffic stream.

Based on the fields/subfields, etc. as described above, while establishing membership for the R-TWT schedule, the AP and STA may perform negotiation of TIDs for low latency (LL) traffic to be transmitted to each other, i.e., traffic related to R-TWT.

Additionally, the AP may announce the R-TWT SP. In the present disclosure, R-TWT SP may also be referred to as RSP.

STAs that support broadcast TWT's restricted service period (SP), i.e., R-TWT SP operation (e.g., low-latency STAs), may inform the AP that they shall transmit latency-sensitive data based on R-TWT operation. If the AP supports the R-TWT operation/mode, the AP may transmit a frame containing scheduling information of the TWTs requested by each STA to the low-latency STA and other STA(s). For example, to perform an operation for R-TWT, non-AP STAs may obtain R-TWT related information from the AP, through a beacon frame, a probe response frame, a (re) association response frame, or another frame of an as-yet-undefined format (e.g., a frame for broadcast, advertisement, announcement). Although a beacon frame is used as an example as a frame containing R-TWT-related information known in this way, R-TWT-related information may be announced through various management frames as described above.

According to the R-TWT operation, A separate TXOP (i.e., a TXOP where access to other STAs is restricted) may be secured within the R-TWT SP using NAV such as (MU) RTS/CTS or CTS-to-self, or quiet interval, etc. A restricted TXOP may be secured. Before the R-TWT SP starts, if there is a TXOP of an STA other than the STA with membership in the R-TWT schedule (i.e., a non-member STA), it shall be stopped. And TXOP of other STAs (i.e., non-member STAs) may be additionally performed after the R-TWT SP ends.

Figure 20:
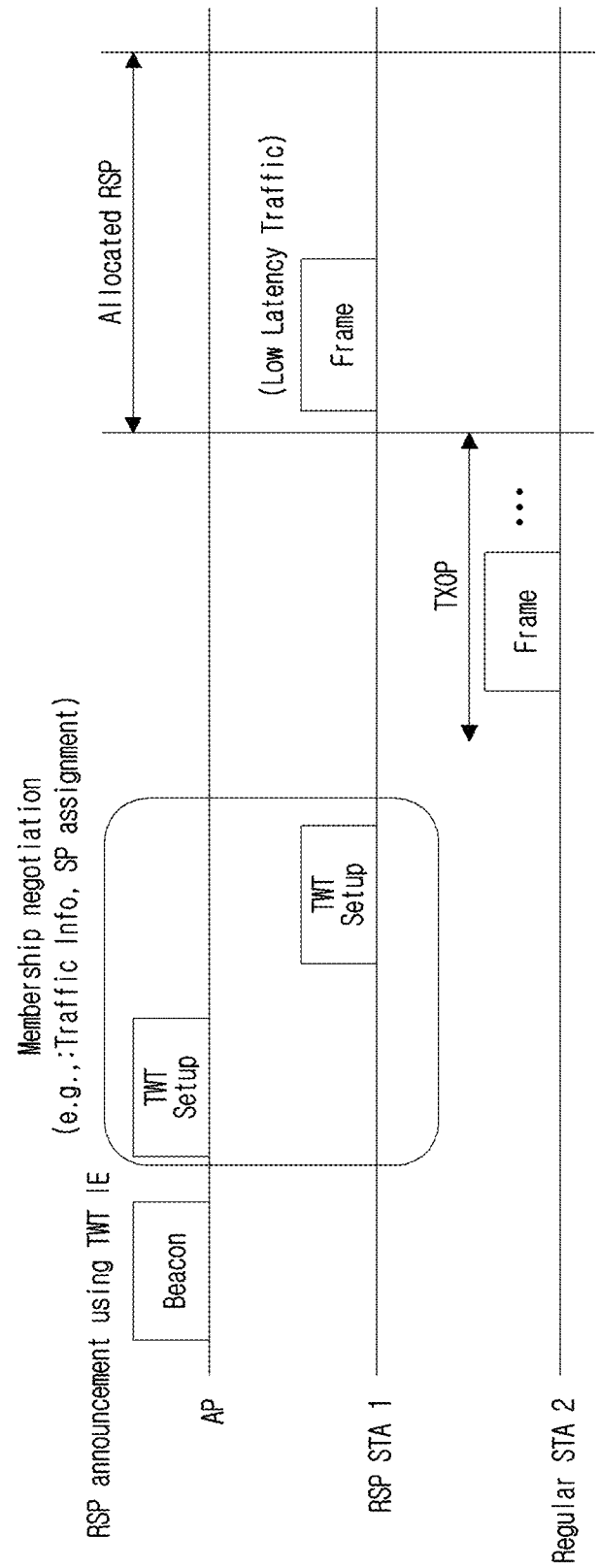
FIG. 20 illustrates a restricted TWT operation to which this disclosure can be applied.

FIG. 20 illustrates a restricted TWT operation to which the present disclosure may be applied.

Referring to FIG. 20, STA 1 may correspond to an RSP STA as an STA that recognizes/supports RSP, and STA 2 may correspond to a Non-RSP STA (or Regular STA) as an STA that does not recognize/support RSP.

As described above, the AP may announce R-TWT related information (e.g., RSP related information) using TWT information. In general, RSPs may be allocated for STA(s) with low latency traffic. Here, the STA may include an AP STA or a non-AP STA.

AP and STA may establish membership to the specified RSP based on TWT-related parameters. As an example, the AP and STA may perform membership negotiation for the RSP through the exchange of TWT setup-related information (e.g., traffic information, SP assignment, etc.).

In FIG. 20, the RSP announcement procedure by the AP is shown as being performed before the membership negotiation procedure, but the RSP announcement procedure may be performed after any R-TWT membership is set up according to the membership negotiation.

At this time, STA 2 (e.g., non-member STA) that does not support RSP shall stop its TXOP if it exists before the RSP starts.

In relation to the above-described R-TWT operation, ensuring priority for low-latency traffic transmission within the RSP may be very important.

Therefore, the present disclosure proposes a method for configuring/defining channel access rules to ensure priority for low-latency traffic transmission within RSP.

While establishing R-TWT-related membership, the AP and STA may negotiate TIDs for low-latency traffic to be transmitted to each other. This may mean that traffic for the TID to be transmitted and received during RSP is regarded as low latency traffic.

Here, the TID may include an R-TWT DL TID related to DL traffic transmitted from the AP to the STA within the RSP and/or an R-TWT UL TID related to UL traffic transmitted from the STA to the AP within the RSP. Hereinafter, for clarity of explanation, the corresponding TID is referred to as R-TWT TID.

At this time, transmitting a TID that does not correspond to the R-TWT TID allows the transmission of traffic that does not correspond to low latency traffic, so the role of the RSP may become ambiguous.

Here, the TID may be related to an access category (AC) in terms of channel access for frame transmission.

Table 1 illustrates the mapping relationship between access category (AC) and user priority (UP).

TABLE 1

| Priority | UP | AC | Transmit queue (dot11Alternate-EDCAActivated false or not present) | Transmit queue (dot11Alternate EDCAActivated true) | Designation |
|---|---|---|---|---|---|
| Lowest | 1 | AC_BK | BK | BK | Background |
| Highest | 2 | AC_BK | BK | BK | Background |
| | 0 | AC_BE | BE | BE | Best Effort |
| | 3 | AC_BE | BE | BE | Best Effort |
| | 4 | AC_VI | VI | A_VI | Video (alternate) |
| | 5 | AC_VI | VI | VI | Video (alternate) |
| | 6 | AC_VO | VO | VO | Voice (alternate) |
| | 7 | AC_VO | VO | A_VO | Voice (alternate) |

Referring to Table 1, user priority (UP) is mapped for each access category (AC), and the priority for this may be defined. In Table 1, the Designation column indicates general use/guidance.

In this regard, the value of the TID related to priority may be interpreted as user priority (UP). As an example, TID values 0 to 7 may be interpreted as UP values 0 to 7. That is, the UP information/value in Table 1 may be regarded as the aforementioned TID information/value.

Therefore, a method to define/apply new rules from a channel access perspective using the relation between AC and TID to prevent the above-mentioned ambiguity will be proposed.

The following embodiments are divided for clarity of explanation, and each embodiment may be applied independently, or the embodiments may be applied in combination/combined with each other.

The following embodiments are explained assuming that a back-off counter exists for each AC.

Embodiment 1

If any R-TWT TID is not included among the TIDs mapped to one access category (AC), contention, that is, back-off, may not be performed for that AC. If there is a back-off that is currently being performed, the back-off may be stopped.

In the present disclosure, performing back-off may mean performing an operation of decrementing a back-off counter. That is, with respect to the R-TWT TID to be transmitted during the RSP, the STA that has established/has membership for that RSP may stop the operation of decrementing the back-off counter of the AC to which no R-TWT TID(s) are mapped. That is, back-off operations for ACs not associated with the R-TWT TID may need to be stopped within the corresponding RSP.

Additionally or alternatively, in order to increase efficiency outside of RSP, contention for the corresponding AC is performed, i.e. back-off is performed, but when the back-off counter becomes 0, a method of not transmitting data for the TID of the corresponding AC may be considered. In this case, back-off may be resumed or data transmission may be deferred while maintaining the back-off counter.

Embodiment 2

If at least one R-TWT TID is also included among the TIDs mapped to one access category (AC), contention, that is, back-off, can be performed for the corresponding AC.

At this time, when the value of the back-off counter is 0, only data for the TID corresponding to the R-TWT TID among the TIDs of the corresponding AC may be transmitted through the frame.

Figure 21:
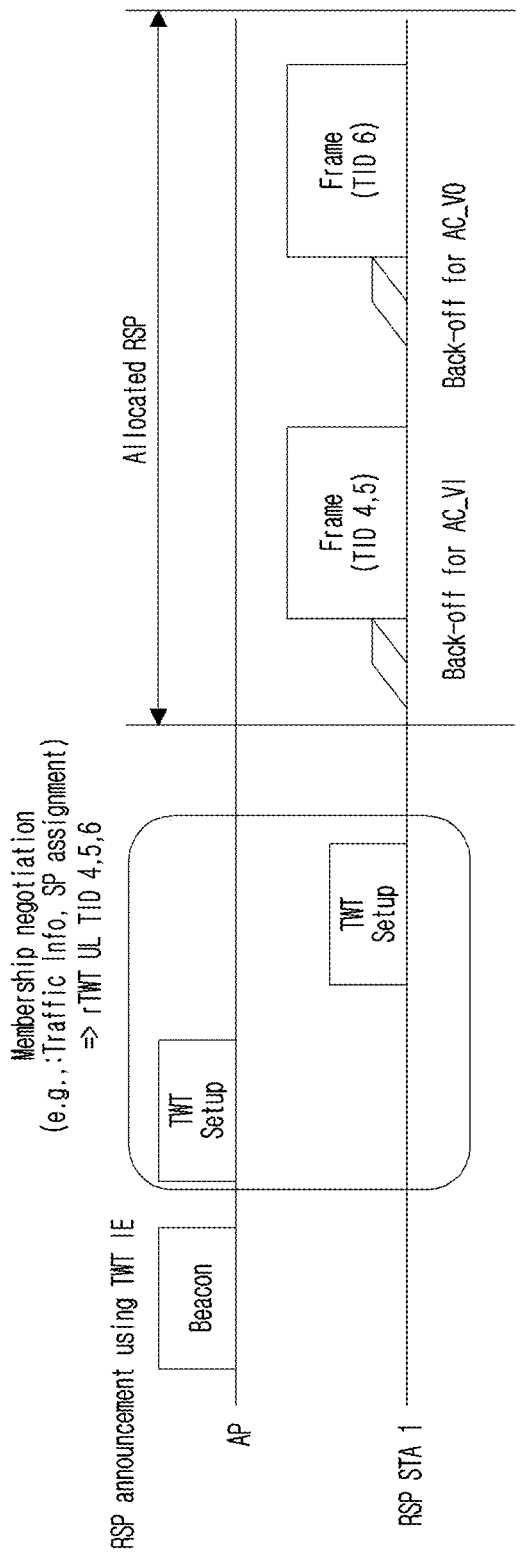
FIG. 21 illustrates channel access operation in a restricted TWT SP according to an embodiment of the present disclosure.

FIG. 21 illustrates channel access operation in a restricted TWT SP according to an embodiment of the present disclosure.

Referring to FIG. 21, STA 1 may correspond to an RSP STA as an STA that recognizes/supports RSP.

For example, through the membership negotiation procedure, AP and STA 1 may negotiate for R-TWT UL TID TID 4, TID 5, and TID 6 as low latency (LL) traffic within the assigned/allocated RSP.

In this case, referring to the mapping relation between AC and UP and the relation between UP and TID in Table 1 above, both TID 4 and TID 5 related to AC_VI may correspond to R-TWT UL TID within RSP. Additionally, among TID 6 and TID 7 related to AC_VO, only TID 6 may correspond to the R-TWT UL TID within RSP.

Accordingly, STA 1 may perform a back-off operation for AC_VI among ACs. If the frame transmission point is reached, STA 1 may transmit data for TID 4 and TID 5 by including it in the frame.

Additionally, STA 1 may perform a back-off operation for AC_VO among ACs. If the frame transmission point is reached, STA 1 may transmit only data for TID 6 by including it in the frame. That is, TID 7 associated with AC_VO does not correspond to/is not included in the R-TWT UL TID, so even if data for TID 7 exists in the queue, it may not be transmitted (i.e., not included in the frame).

On the other hand, within the allocated RSP, STA 1 may not perform back-off operation for AC_BK and AC_BE that are not included/associated with any R-TWT UL TID.

Figure 22:
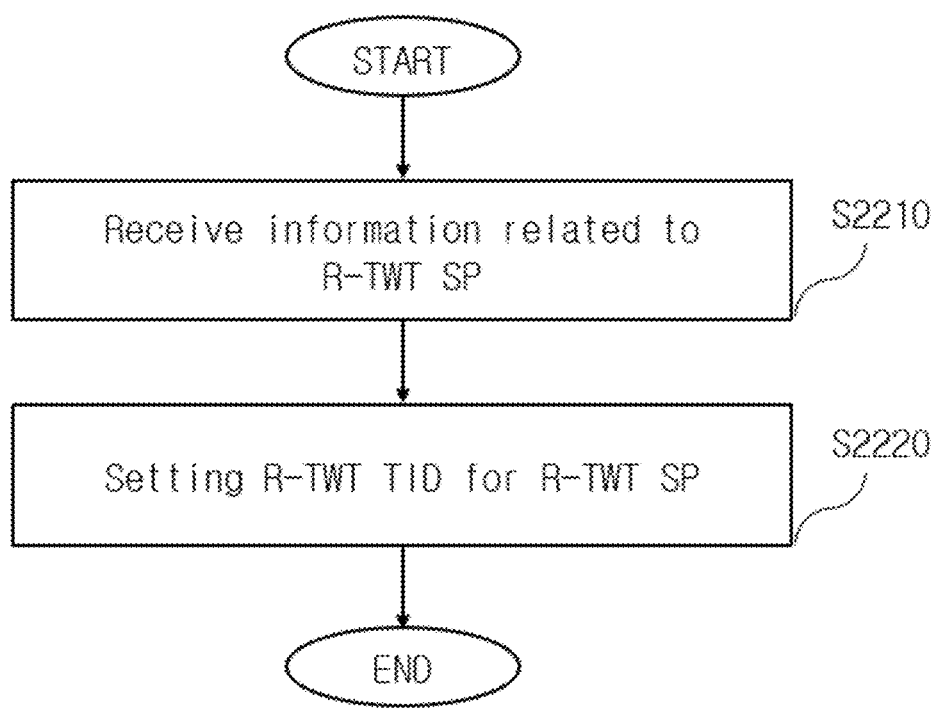
FIG. 22 is a diagram for explaining the operation of an STA supporting back-off operation within the R-TWT SP according to an embodiment of the present disclosure.

FIG. 22 is a diagram for explaining the operation of an STA supporting back-off operation within the R-TWT SP according to an embodiment of the present disclosure.

FIG. 22 illustrates the operation of the STA based on the previously proposed methods (e.g., any one of the above-described embodiments 1, 2, and detailed embodiments thereof, or a combination of one or more (detailed) embodiments).

In step S2210, the STA may receive R-TWT SP related information from the AP.

Here, R-TWT SP related information may include information related to RSP allocation/scheduling.

For example, the R-TWT SP related information may be advertised/announced to the STA through a management frame such as a beacon frame.

In step S2220, the STA may set at least one R-TWT traffic identifier (TID) for the R-TWT SP. Based on at least one R-TWT TID set in this way, the corresponding STA may transmit and receive data/traffic through frames within the RSP.

Here, whether to perform a back-off operation for an access category (AC) in the R-TWT SP may be determined based on the mapping relation between the at least one R-TWT TID and the AC.

For example, if the at least one R-TWT TID is not mapped to the AC, a back-off operation for the AC within the R-TWT SP may not be performed. That is, for an AC to which no R-TWT TID is mapped/included, the STA may not perform a back-off operation (i.e., an operation to decrease the back-off counter value).

Through this, transmission of traffic/data that does not correspond to the R-TWT TID may not be performed within the RSP.

For example, the at least one R-TWT TID may correspond to at least one TID for latency-related traffic in the uplink or downlink within the R-TWT SP. In this regard, the AC is mapped to at least one user priority (UP), and each of the at least one UP may be interpreted as a TID.

For example, the at least one R-TWT TID may be set through a membership setup procedure between the STA and the AP. In this regard, the membership setup procedure may be performed using a TWT setup frame exchanged between the STA and the AP. Additionally or alternatively, the at least one R-TWT TID may be determined based on traffic information (Traffic Info) (e.g., Traffic Info field) in the membership setup procedure.

For example, if any one of the at least one R-TWT TID is mapped to the AC, a back-off operation for the AC may be performed within the R-TWT SP. At this time, frames transmitted and received within the R-TWT SP may include only data corresponding to the R-TWT TID mapped to the AC.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system, 5G system, but may be applied to various WLAN or wireless communication systems other than the IEEE 802.11-based system.

What is claimed is:

1. A method performed by a station (STA) in a wireless local area network (WLAN) system, the method comprising:
   receiving information related to a restricted-target wake time (R-TWT) service period (SP) from an access point (AP); and
   setting at least one R-TWT traffic identifier (TID) for the R-TWT SP, through a membership setup procedure between the STA and the AP,
   wherein a frame exchange based on the at least one R-TWT TID is performed during the R-TWT SP, and
   wherein, based on a pre-defined channel access rule, a back-off operation for an access category (AC) mapped with none of the at least one R-TWT TID is suspended during the R-TWT SP.

2. The method of claim 1,
   wherein the at least one R-TWT TID corresponds to at least one TID for latency-related traffic in uplink or downlink during the R-TWT SP.

3. The method of claim 2,
   wherein the AC is mapped to at least one user priority (UP), and
   wherein each of the at least one UP is interpreted as a TID.

4. The method of claim 1,
   wherein the membership setup procedure is performed using a TWT setup frame exchanged between the STA and the AP.

5. The method of claim 1,
   wherein the at least one R-TWT TID is determined based on traffic information in the membership setup procedure.

6. The method of claim 1,
   wherein, the frame exchange is performed by decrementing a back-off counter of an AC being mapped with any one of the at least one R-TWT TID to 0.

7. The method of claim 6,
   wherein the frame exchange during the R-TWT SP includes only latency-related traffic exchange corresponding to the any one of the at least one R-TWT TID.

8. The method of claim 1,
   wherein information related to the R-TWT SP is announced by a beacon frame.

9. A station (STA) device in a wireless local area network (WLAN) system, the device comprising:
   at least one transceiver; and
   at least one processor coupled with the at least one transceiver,
   wherein the at least one processor is configured to:
   receive information related to a restricted-target wake time (R-TWT) service period (SP) from an access point (AP); and
   set at least one R-TWT traffic identifier (TID) for the R-TWT SP, through a membership setup procedure between the STA and the AP,
   wherein a frame exchange based on the at least one R-TWT TID is performed during the R-TWT SP, and
   wherein, based on a pre-defined channel access rule, a back-off operation for an access category (AC) mapped with none of the at least one R-TWT TID is suspended during the R-TWT SP.

10. The device of claim 9,
    wherein the at least one R-TWT TID corresponds to at least one TID for latency-related traffic in uplink or downlink during the R-TWT SP.

11. The device of claim 10,
    wherein the AC is mapped to at least one user priority (UP), and
    wherein each of the at least one UP is interpreted as a TID.

12. The device of claim 9,
    wherein the membership setup procedure is performed using a TWT setup frame exchanged between the STA and the AP.

13. The device of claim 9,
    wherein the at least one R-TWT TID is determined based on traffic information in the membership setup procedure.

14. The device of claim 9,
    wherein, the frame exchange is performed by decrementing a back-off counter of an AC being mapped with any one of the at least one R-TWT TID to 0.

15. The device of claim 14,
    wherein the frame exchange during the R-TWT SP includes only latency-related traffic exchange corresponding to the any one of the at least one R-TWT TID.

16. The device of claim 9,
    wherein information related to the R-TWT SP is announced by a beacon frame.

* * * * *